US009655039B2

United States Patent
Krishnamoorthy et al.

(10) Patent No.: US 9,655,039 B2
(45) Date of Patent: May 16, 2017

(54) DYNAMIC CELL RESELECTION TO IMPROVE DEVICE-TO-DEVICE COMMUNICATIONS

(71) Applicant: QUALCOMM Incorporated, San Diego, CA (US)

(72) Inventors: Parthasarathy Krishnamoorthy, San Diego, CA (US); Anand Rajurkar, Hyderabad (IN); Prashanth Mohan, Hyderabad (IN); Aravinth Rajendran, Hyderabad (IN); Janga Reddy Alimineti, Hyderabad (IN); KrishnaKumar Vasanthasenan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 14/752,546

(22) Filed: Jun. 26, 2015

(65) Prior Publication Data

US 2016/0381630 A1 Dec. 29, 2016

(51) Int. Cl.
*H04W 4/00* (2009.01)
*H04W 48/20* (2009.01)
*H04W 36/08* (2009.01)
*H04W 76/04* (2009.01)
(Continued)

(52) U.S. Cl.
CPC ........... *H04W 48/20* (2013.01); *H04W 8/005* (2013.01); *H04W 24/10* (2013.01); *H04W 36/08* (2013.01);
(Continued)

(58) Field of Classification Search
CPC ......... H04W 48/20; H04W 76/023027; H04W 8/005; H04W 24/10; H04W 68/005; H04W 36/165; H04W 88/06; H04W 84/042
(Continued)

(56) References Cited

U.S. PATENT DOCUMENTS

| 8,565,154 B2 | 10/2013 | Ji et al. | |
| 8,923,254 B2 * | 12/2014 | Park | H04L 5/0053 370/329 |

(Continued)

FOREIGN PATENT DOCUMENTS

| WO | 2014070058 A1 | 5/2014 |
| WO | 2014084028 A1 | 6/2014 |

(Continued)

OTHER PUBLICATIONS

International Search Report and Written Opinion—PCT/US2016/033869—ISA/EPO—Aug. 4, 2016.

*Primary Examiner* — Thai Hoang
(74) *Attorney, Agent, or Firm* — MG-IP Law, P.C.

(57) ABSTRACT

The disclosure generally relates to dynamic cell reselection to improve device-to-device (D2D) communications where two or more D2D peers are camped onto different cells and one or more D2D peers are located in an overlap region between the cells. For example, in various embodiments, the D2D peers may exchange one or more communication parameters over the (inter-cell) D2D connection and detect that the D2D peers are camped on different base stations (i.e., attached to different cells) based on the exchanged communication parameters. The D2D peer(s) located in the cell overlap region may then obtain measurements on the neighbor cell and a forced cell reselection may be triggered at the appropriate D2D peer(s) located in the cell overlap region such that the D2D peers are camped on the same base station, thereby converting the inter-cell D2D connection into an intra-cell D2D connection that can be more easily maintained.

48 Claims, 14 Drawing Sheets

(51) Int. Cl.
*H04W 8/00* (2009.01)
*H04W 24/10* (2009.01)
*H04W 36/16* (2009.01)
*H04W 68/00* (2009.01)
*H04W 76/02* (2009.01)
*H04W 84/04* (2009.01)
*H04W 88/06* (2009.01)

(52) U.S. Cl.
CPC ....... *H04W 36/165* (2013.01); *H04W 68/005* (2013.01); *H04W 76/023* (2013.01); *H04W 76/027* (2013.01); *H04W 76/043* (2013.01); *H04W 84/042* (2013.01); *H04W 88/06* (2013.01)

(58) Field of Classification Search
USPC .... 370/253, 329–334, 310.2, 335, 336, 338, 370/342–345; 455/436–444
See application file for complete search history.

(56) References Cited

U.S. PATENT DOCUMENTS

| | | | | |
|---|---|---|---|---|
| 2011/0110254 A1* | 5/2011 | Ji | ............... | H04W 36/0066 370/252 |
| 2013/0244669 A1 | 9/2013 | Das et al. | | |
| 2013/0324114 A1 | 12/2013 | Raghothaman et al. | | |
| 2014/0153417 A1* | 6/2014 | Gupta | ............... | H04W 52/0219 370/252 |
| 2015/0146687 A1 | 5/2015 | Kim et al. | | |
| 2015/0296344 A1* | 10/2015 | Trojer | ............... | H04W 4/027 455/456.1 |
| 2015/0312836 A1 | 10/2015 | Fukuta | | |
| 2015/0319737 A1* | 11/2015 | Cheng | ............... | H04W 72/04 370/329 |
| 2015/0341816 A1* | 11/2015 | Lee | ............... | H04L 5/0092 370/252 |
| 2015/0369901 A1* | 12/2015 | Josefiak | ............... | G01S 5/00 455/456.5 |
| 2016/0021695 A1* | 1/2016 | Axmon | ............... | H04W 24/08 370/329 |
| 2016/0112178 A1* | 4/2016 | Yi | ............... | H04W 16/32 370/280 |
| 2016/0242144 A1* | 8/2016 | Adachi | ............... | H04W 72/04 |

FOREIGN PATENT DOCUMENTS

WO 2014089094 A1 6/2014
WO 2015110991 A1 7/2015

* cited by examiner

DYNAMIC CELL RESELECTION TO IMPROVE DEVICE-TO-DEVICE COMMUNICATIONS

TECHNICAL FIELD

The various aspects and embodiments described herein generally relate to device-to-device (D2D) communication, and in particular, to dynamically reselecting a new cell while engaged in a D2D communication session in which at least one peer device is located in a cell overlap region to improve D2D communication performance.

BACKGROUND

Wireless communication systems are widely deployed to provide various types of communication content, including voice, video, packet data, messaging, and broadcast, among many others. Wireless communication systems (e.g., multiple-access networks that can share available network resources to support multiple users) have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different wireless communication systems in use, including Cellular and Personal Communications Service (PCS) systems. Example cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), Orthogonal FDMA (OFDMA), Single-Carrier FDMA (SC-FDMA), the Global System for Mobile access (GSM) TDMA variation, and newer hybrid digital communication systems that use both TDMA and CDMA technologies. More recently, Long Term Evolution (LTE) has been developed as a wireless communication protocol for wireless communication of high-speed data for mobile phones and other data terminals. LTE is based on GSM, and includes contributions from various GSM-related protocols (e.g., Enhanced Data rates for GSM Evolution (EDGE)) and Universal Mobile Telecommunications System (UMTS) protocols (e.g., High-Speed Packet Access (HSPA)).

In general, a wireless communication network may include various base stations (also referred to as evolved node Bs, eNBs, or access nodes) that can support communication for various user equipments (UEs). In a WAN, a UE typically communicates via uplink/downlink channels between the UE and a base station to thereby communicate with the base station. However, if two or more UEs are in within sufficient proximity to one another, the UEs may be enabled to communicate directly, that is, without communicating through any base station. A UE may therefore support direct peer-to-peer (P2P) or device-to-device (D2D) communication with one or more other UEs. For example, LTE Direct (LTE-D, sometimes also referred to as "LTE-Advanced") is a proposed 3GPP (Release 12) D2D solution for proximate discovery. LTE-D dispenses with location tracking and network calls by directly monitoring for services on other LTE Direct devices within a large range (~500 m, line of sight). Accordingly, among other advantages, LTE-D can directly monitor for services on other LTE-D devices in a synchronous system and concurrently detect potentially thousands of services in proximity in a continuous and battery efficient manner.

LTE-D operates on licensed spectrum as a service to mobile applications and provides D2D solution that enables service layer discovery. Mobile applications on LTE-D devices can instruct LTE-D to monitor for mobile application services on other devices and announce their own services at the physical layer for detection by services on other LTE-D devices, which allows the applications to be closed while LTE-D does the work in a substantially continuous manner and notifies the client application when a match to the monitor is detected. Accordingly, LTE-D is an attractive alternative to mobile developers seeking to deploy proximate discovery solutions to extend their existing services. For example, LTE-D is a distributed discovery solution (versus the centralized discovery that exists today), whereby mobile applications may forego centralized database processing in identifying relevancy matches because relevance may instead be determined autonomously at the device level via transmitting and monitoring for relevant attributes. LTE-D offers additional power consumption benefits because LTE-D does not perpetually track location to determine proximity and privacy benefits because discovery may be kept on the device such that users have more control over information shared with external devices.

Furthermore, LTE-D can increase network efficiency because devices communicate directly using cellular spectrum without utilizing the cellular network infrastructure. As such, because LTE-D uses licensed cellular spectrum, cellular coverage can be extended and interference from other devices can be controlled (unlike D2D communication in unlicensed bands). Accordingly, LTE-D may use direct connections to transfer substantial data between LTE-D enabled devices that are within sufficient proximity, thereby offloading traffic from the network infrastructure. Moreover, in addition to allowing high data transfer rates, LTE-D offers low delays and low energy consumption at the UEs communicating over an LTE-D link. Furthermore, LTE-D offers applications in national security and public safety networks because LTE provides high data rates that can enable real-time data and multimedia exchange between emergency personnel in crisis situations and the D2D functionality can improve performance in LTE-based public safety networks in the event that the LTE infrastructure may be totally or partially disabled (e.g., in disaster scenarios such as earthquakes, hurricanes, terrorist attacks, etc.).

Accordingly, techniques to efficiently support D2D communication are desired to enable new services, improve existing services, eliminate and/or reduce interference, and/or reduce traffic load on network infrastructures, among other things.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, the disclosure generally relates to dynamic cell reselection to improve device-todevice (D2D) communications where two or more D2D peers are camped onto different cells and one or more D2D peers are located in an overlap region between the cells. For example, in various embodiments, the D2D peers may exchange one or more communication parameters over the (inter-cell) D2D connection and detect that the D2D peers are camped on different base stations (i.e., attached to different cells) based on the exchanged communication parameters. The D2D peer(s) located in the cell overlap region may then obtain measurements on the neighbor cell and a forced cell reselection may be triggered at the appropriate D2D peer(s) located in the cell overlap region such that the D2D peers are camped on the same base station, thereby converting the inter-cell D2D connection into an intra-cell D2D connection such that proximity services between the D2D peers can be more easily maintained and the D2D peers may not be forced to revert to more inefficient legacy links with their respective base stations.

According to various aspects, a method for improving device-to-device (D2D) communication in an LTE Direct (LTE-D) communication system may comprise exchanging communication information between a first user equipment (UE) and a second UE over an LTE-D connection, detecting that the first UE is camped on a first base station and that the second UE is camped on a second base station based on the exchanged communication information, measuring, at the first UE, one or more communication parameters with the second base station in response to detecting that at least the first UE is in an overlapping coverage region associated with the first base station and the second base station, and triggering a forced cell reselection such that the first UE and the second UE are each camped on the same base station in response to the one or more measured communication parameters satisfying one or more performance criteria (e.g., a threshold value sufficient to reselect from the first base station to the second base station). Furthermore, in various embodiments, the UE at which the forced reselection is triggered may return to the original base station in response to the forced reselection failing, and the forced reselection may not be triggered at any UE that may be exchanging data with the current base station over an active data connection.

According to various aspects, a wireless device may comprise a transceiver configured to exchange communication information with a peer wireless device over an LTE-D connection and one or more processors configured to detect that the wireless device is camped on a first base station and that the peer wireless device is camped on a second base station based on the communication information exchanged with the peer wireless device, measure one or more communication parameters with the second base station in response to detecting presence in an overlapping coverage region associated with the first base station and the second base station, and trigger a forced cell reselection such that the wireless device and the peer wireless device are each camped on the same base station.

According to various aspects, an apparatus may comprise means for exchanging communication information with a peer wireless device over an LTE-D connection, means for detecting that the apparatus is camped on a first base station and that the peer wireless device is camped on a second base station based on the communication information exchanged with the peer wireless device, means for measuring one or more communication parameters with the second base station in response to detecting presence in an overlapping coverage region associated with the first base station and the second base station, and means for triggering a forced cell reselection such that the apparatus and the peer wireless device are each camped on the same base station.

According to various aspects, a computer-readable storage medium may have computer-executable instructions recorded thereon, wherein executing the computer-executable instructions on a wireless device having one or more processors may cause the one or more processors to exchange communication information with a peer wireless device over an LTE-D connection, detect that the wireless device is camped on a first base station and that the peer wireless device is camped on a second base station based on the communication information exchanged with the peer wireless device, measure one or more communication parameters with the second base station in response to detecting presence in an overlapping coverage region associated with the first base station and the second base station, and trigger a forced cell reselection such that the wireless device and the peer wireless device are each camped on the same base station.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
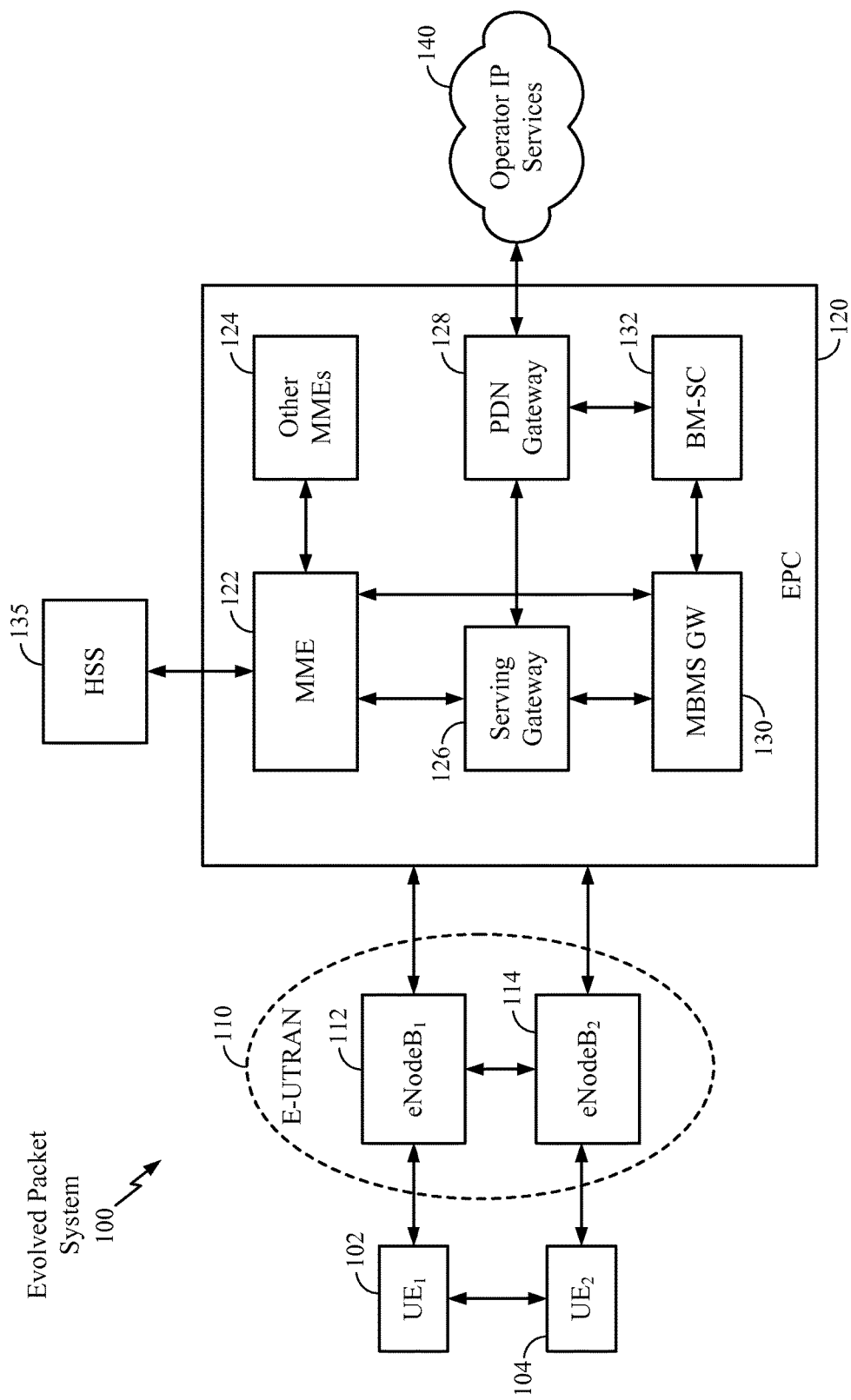
FIG. 1 illustrates an exemplary wireless network architecture supporting device-to-device (D2D) communication, according to various aspects.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further appreciate that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or a combination thereof. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used in connection with various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from an organization named "3rd Generation Partnership Project" (3GPP). CDMA2000 and UMB are described in documents from an organization named "3rd Generation Partnership Project 2" (3GPP2). For clarity, certain aspects are described below for LTE, and LTE terminology may be used in much of the description below.

According to various aspects, FIG. 1 illustrates an exemplary wireless network architecture 100 that may support device-to-device (D2D) communication, wherein the wireless network architecture 100 may comprise a Long Term Evolution (LTE) (or Evolved Packet System (EPS)) network architecture 100. In various embodiments, the network architecture 100 may include a first user equipment ($UE_1$) 102, a second user equipment ($UE_2$) 104, an Evolved UMTS Terrestrial Radio Access Network (E-UTRAN) 110, an Evolved Packet Core (EPC) 120, a Home Subscriber Server (HSS) 135, and Internet Protocol (IP) Services 140 associated with an operator (e.g., a mobile network operator (MNO)). The EPS network architecture 100 can interconnect with other access networks and core networks (not shown), such as a UMTS access network or an IP core network. As shown, the EPS network architecture 100 provides packet-switched services; however, those skilled in the art will readily appreciate that the various concepts disclosed herein may be extended to networks that provide circuit-switched services.

In various embodiments, implementation, the E-UTRAN 110 may include a first evolved Node B ($eNB_1$) 112 in communication with $UE_1$ 102 and a second eNB ($eNB_2$) 114 in communication with $UE_2$ 104. The eNBs 112, 114 may provide user and control plane protocol terminations toward the UEs 102, 104 and may be connected to each other via a backhaul (e.g., an X2 interface). The eNBs 112, 114 may also be referred to as base stations, Node Bs, access points, base transceiver stations, radio base stations, radio transceivers, transceiver functions, a basic service set (BSS), an extended service set (ESS), or some other suitable terminology. The eNBs 112, 114 each provide an access point to the EPC 120 for the respective UEs 102, 104. Example UEs 102, 104 may include, without limitation, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. Furthermore, those skilled in the art will appreciate that the UE 102 and/or UE 104 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, etc.

The eNBs 112, 114 may each connect to the EPC 120 via an Si interface, wherein the EPC 120 may include a Mobility Management Entity (MME) 122, other MMEs 124, a Serving Gateway 126, a Multimedia Broadcast Multicast Service (MBMS) Gateway 130, a Broadcast Multicast Service Center (BM-SC) 132, and a Packet Data Network (PDN) Gateway 128. The MME 122 is the control node that processes the signaling between the UEs 102, 104 and the EPC 120. Generally, the MME 122 provides bearer and connection management. All user IP packets are transferred through the Serving Gateway 126, which may be connected to the PDN Gateway 128. The PDN Gateway 128 provides UE IP address allocation as well as other functions. The PDN Gateway 128 is connected to the Operator IP Services 140, which may include the Internet, an intranet, an IP Multimedia Subsystem (IMS), and a PS Streaming Service (PSS). The BM-SC 132 may provide functions for MBMS user service provisioning and delivery. The BM-SC 132 may serve as an entry point for content provider MBMS transmission, may be used to authorize and initiate MBMS Bearer Services within a PLMN, and may be used to schedule and deliver MBMS transmissions. The MBMS Gateway 130 may be used to distribute MBMS traffic to the eNBs (e.g., 112, 114) belonging to a Multicast Broadcast Single Frequency Network (MBSFN) area broadcasting a particular service, and may be responsible for session management (start/stop) and for collecting eMBMS related charging information.

In various embodiments, a UE pair (e.g., $UE_1$ 102 and $UE_2$ 104) may establish a device-to-device (D2D) connection to communicate directly without utilizing the respective $eNB_1$ 112 and $eNB_2$ 114 and subsequently transfer data traffic over the D2D connection. In general, one or more entities in the network infrastructure (e.g., eNBs 112, 114, entities in the EPC 120, etc.) may coordinate the D2D communication between the UE pair 102, 104, in that the network entities may assist in establishing the D2D connection, control use in a D2D mode versus a legacy mode, provide security support, etc. As used herein, the term "D2D mode" and variants thereof may generally refer to direct communication between two or more UEs 102, 104, and the term "legacy mode" and variants thereof may generally refer to communication between two or more UEs 102, 104 via the network (e.g., via the eNBs 112, 114). In various embodiments, the UE pair 102, 104 may establish the D2D mode autonomously, wherein initial discovery and establishing the D2D connection may be based on an ability to communicate signals directly between the UEs 102, 104. Additionally or in the alternative, UEs that are attached to a network that does not support the D2D mode but permits the D2D mode, the UEs 102, 104 may connect via the network and exchange serving cell and location information to determine whether the D2D mode is possible. Once the D2D mode is in progress, one or more UEs 102, 104 may monitor relative locations associated therewith. Furthermore, a group including three or more UEs may enter D2D mode whereby some or all UE pairs in the group may maintain direct D2D communication between one another and whereby some UEs in the group may act as relays to relay D2D communication between other UEs in the group. For example, one UE in the group may be designated to operate in a relay role to maintain direct D2D communication with the other UE(s) in the group and act in a relay role in order to enable the other UE(s) to communicate indirectly via D2D communication. In this example, the UE operating in the relay role may relay communications between the other UE(s) in the group. A group that includes several UEs employing D2D communication between one another may monitor relative locations associated therewith and assign (and/or reassign) the relay role to any UE in the group based on the current relative locations associated therewith.

Returning to FIG. 1, in another aspect, the network may assist the two or more UEs 102, 104 to enter the D2D mode in cases where the legacy mode may be unavailable and/or impossible (e.g., if the network is congested or portions thereof have temporarily failed or do not provide continuous radio coverage to both UEs 102, 104). In another aspect, the network (e.g., one or more network entities) may control entry to the D2D mode and support handover between the D2D mode and legacy mode.

Figure 2:
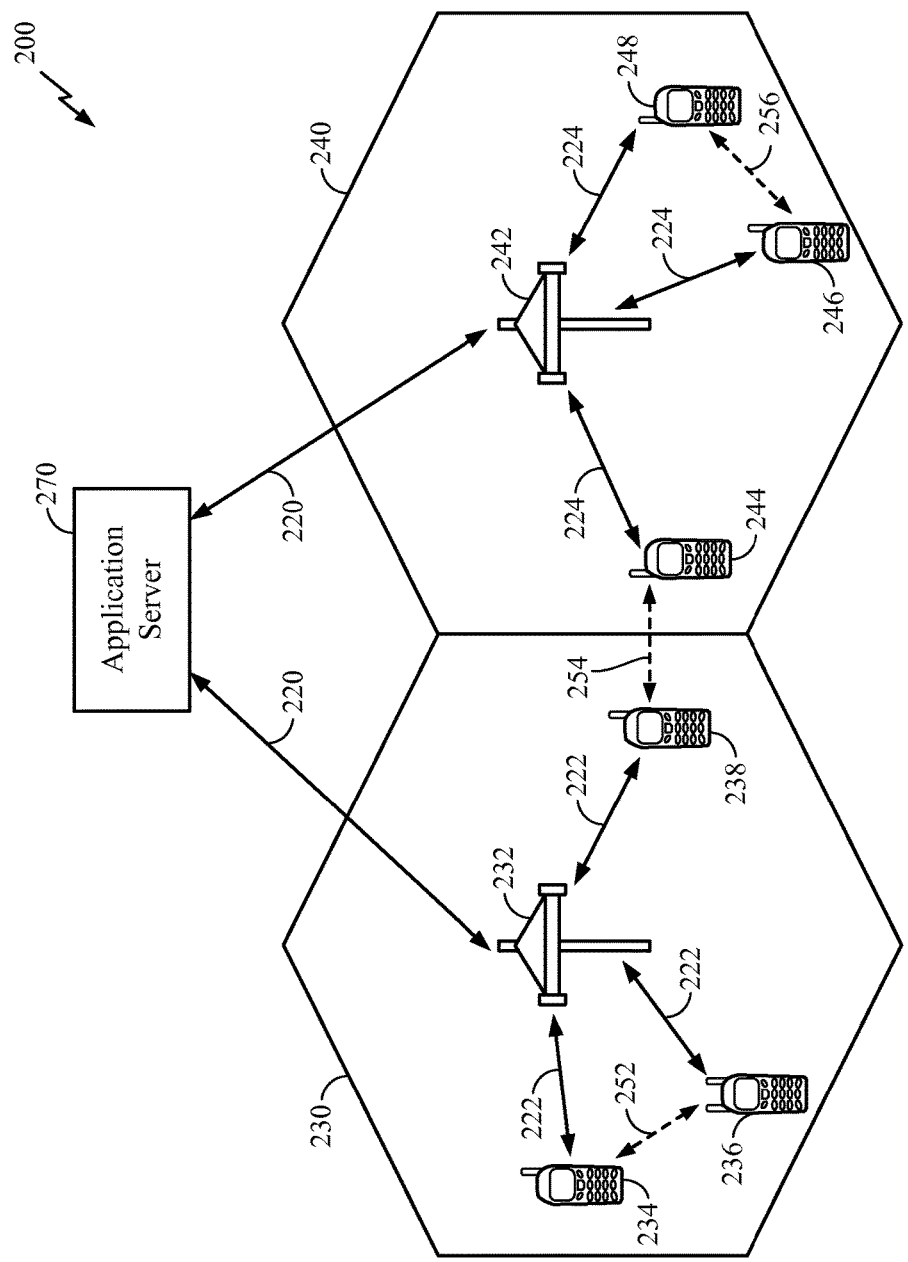
FIG. 2 illustrates an exemplary access network supporting D2D communication, according to various aspects.

According to various aspects, FIG. 2 illustrates an exemplary access network 200 in an LTE network and in which certain devices may communicate over a direct device-to-device (D2D) connection using LTE Direct (LTE-D) while also connecting to a Wireless Wide Area Network (WWAN) or other LTE network infrastructure. Referring to FIG. 2, an application server (or network controller) 270 may be connected to a first cell 230 having a first base station 232, a second cell 240 having a second base station 242, and the application server 270 may be further coupled to the first base stations 232 and the second base station 242 via a network link 220 (e.g., an Rx link, a Gx link, etc.). The coverage area associated with a given base station is represented via the cell in which the given base station is located, whereby in FIG. 2, the first cell 230 includes the coverage area corresponding to the first base station 232 and the second cell 240 includes the coverage area corresponding to the second base station 242. The cells 230, 240 in the access network 200 include various UEs that communicate with the respective base stations 232, 242 and with the application server 270 via the respective base stations 232, 242. For example, in FIG. 2, the first cell 230 includes UE 234, UE 236, and UE 238, while the second cell 240 includes UE 244, UE 246, and UE 248, wherein one or more of the UEs in the access network 200 may be mobile or stationary. Although not shown in FIG. 2, the base stations 232, 242 may be connected to one another via a backhaul link.

According to various aspects, one or more of UE 234, UE 236, UE 238, UE 244, UE 246, and UE 248 may support direct device-to-device (D2D), whereby such UEs may support communicating with one another directly without having to communicate through another device or a network infrastructure element such as the first base station 232 and the second base station 242 and may further support communications through the network infrastructure elements such as the first base station 232 and/or the second base station 242. In legacy communications that involve network infrastructure, signals may generally be transmitted and received through uplink and downlink connections between various UEs and the base stations 232, 242, such as link 222 in the first cell 230 and link 224 in the second cell 240, wherein the base stations 232, 242 each generally serve as the attachment point for the UEs in the corresponding cells 230, 240 and facilitate communications between the UEs served therein. In accordance with various aspects, when two or more UEs, such as UE 234 and UE 236, wish to communicate with one another and are located in sufficient proximity to each other, then a direct D2D link can be established therebetween, which may offload traffic from the base station 232 serving the UEs 234, 236, allow the UEs 234, 236 to communicate more efficiently, or provide other advantages that will be apparent to those skilled in the art.

As shown in FIG. 2, the UE 246 can communicate with UE 248 through intermediate base station 242 via link 224, and UEs 246, 248 may further communicate via a D2D link 256. Furthermore, for inter-cell communications where the participating UEs are in different nearby cells, a direct D2D communications link is still a possibility, which is illustrated in FIG. 2 where UE 238 and UE 244 may communicate using direct D2D communications illustrated by dashed link 254. However, in an LTE Direct (LTE-D) supported network where UEs in different nearby cells can form a direct D2D connection, certain problems may arise when the D2D peer UEs are camped onto different base stations (e.g., in a cell overlap region, as in the case where UE 238 and UE 244 are camped onto different cells 230, 240). In particular, certain measurement difficulties in maintaining the D2D connection between the peer UEs 238, 244 may arise, whereby the proximity services therebetween may be lost and the UEs 238, 244 will be forced to use the legacy link with respective base stations 232, 242 for various data and signaling communications, which may be inefficient for several reasons. For example, reverting to the legacy link may result in unnecessary resource consumption at the base stations 232, 242, which can lead to resource constraints and impact the throughput associated with other UEs that are attached to the same base station(s) 232, 242. Furthermore, unnecessary power consumption can occur at the UEs 238, 244 in that the UEs 238, 244 may need to transmit at high power to close the loop with the respective base stations 232, 242 relative to the proximity D2D link. Accordingly, as will be described in further detail below, the above-mentioned problems may be alleviated via dynamically triggering a forced cell reselection at either UE 238 or UE 244 such that the UE 238/244 moves to the same cell as the peer UE when residing in the cell overlap region, thereby facilitating the proximity services and maintaining an intra-cell D2D link between the UEs 238, 244. Accordingly, UEs 238, 244 may communicate efficiently via the intra-cell D2D link without consuming substantial network resources, which may allow other users in the same network to be allocated more resource blocks from the base stations 232, 242 and thereby achieve high throughput.

Figure 3:
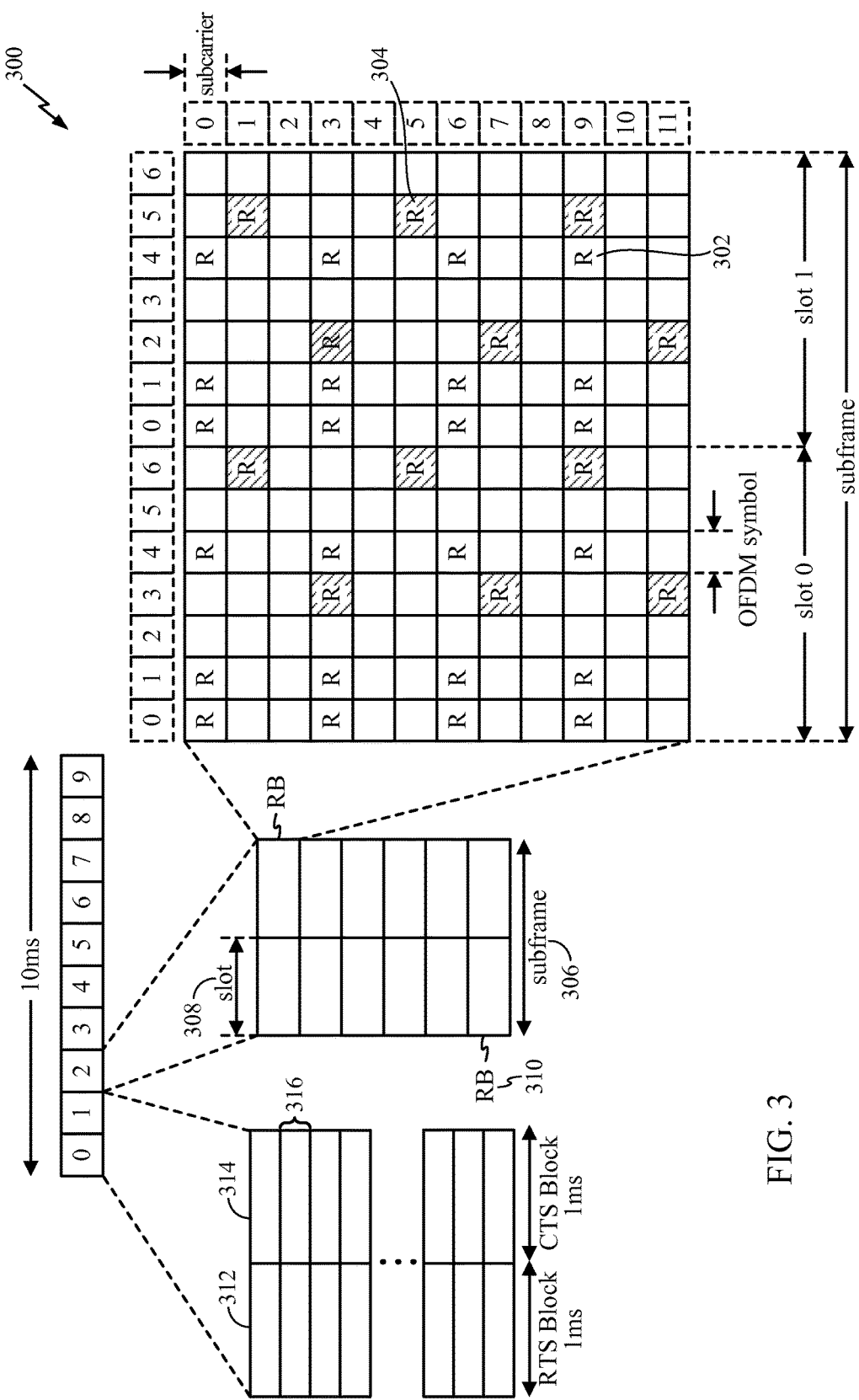
FIG. 3 illustrates an exemplary downlink (DL) frame structure in LTE, according to various aspects.
Figure 4:
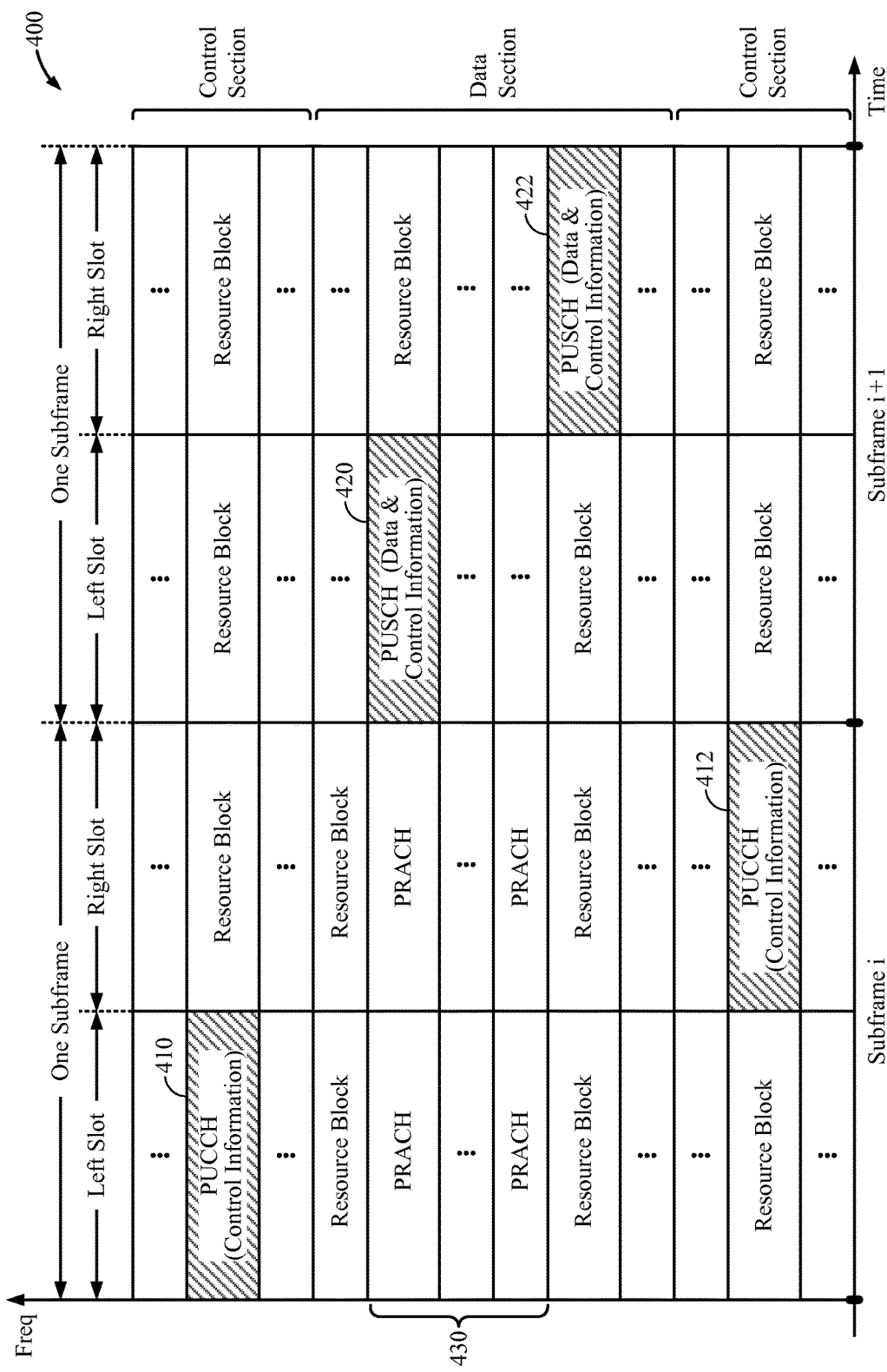
FIG. 4 illustrates an exemplary uplink (UL) frame structure in LTE, according to various aspects.

For example, the various data and signaling issues that may arise when UEs camped onto different cells are engaged in a D2D communication session will become clearer with reference to FIG. 3 and FIG. 4, which respectively illustrate an exemplary downlink (DL) frame structure 300 in LTE and an exemplary uplink (UL) frame structure 400 in LTE.

More particularly, referring to FIG. 3, the DL frame structure 300 in LTE may divide a ten millisecond (10 ms) frame into ten (10) equally sized sub-frames 306. Each sub-frame 306 may include two (2) consecutive time slots 308. A resource grid may be used to represent two time slots, wherein each time slot includes a resource block (RB) 310. In LTE, the resource grid may be divided into multiple resource elements. Further, in LTE, a RB 310 may contain twelve (12) consecutive subcarriers in the frequency domain and, for a normal cyclic prefix in each OFDM symbol, seven (7) consecutive OFDM symbols in the time domain, or eighty-four (84) resource elements. For an extended cyclic prefix, a resource block may contain six (6) consecutive OFDM symbols in the time domain and may have seventy-two (72) resource elements. A physical DL control channel (PDCCH), a physical DL shared channel (PD-SCH), and other channels may be mapped to the resource elements. Furthermore, some resource elements, as indicated as R 302, 304, include DL reference signals (DL-RS), which may include Cell-specific reference signals (CRS) (also sometimes called common RS) 302 and UE-specific reference signals (UE-RS) 304. In general, the UE-RS 304 may be transmitted only on the resource blocks upon which the corresponding PD-SCH is mapped. The number of bits that each resource element carries may vary depending on the modulation scheme. Accordingly, the more RBs that an eNB allocates to a UE and the higher the modulation scheme, the higher the data rate for the UE.

In LTE Direct (e.g., D2D communications in an LTE environment and as applicable to D2D communications as described herein), scheduling D2D communication links may be performed through distributed scheduling. In one aspect, a request to send (RTS)/clear to send (CTS) handshake signaling may be performed before each device in a D2D pair attempts to communicate data over a D2D communications link. In LTE Direct (LTE-D), 24 RBs may be available for RTS/CTS signaling. Further, in LTE-D, a RB may be assigned as a RTS block 312 and another RB may be assigned as a CTS block 314 for each D2D communication link. In other words, each D2D communication link may use a RB pair for RTS/CTS signaling. As used herein, the RB pair may be referred to as a connection identifier (CID) 316. As such, in the above-mentioned scenarios where two or more UEs that have a D2D connection are camped onto different cells, the eNB associated with each cell may allocate at least some resource blocks to the respective UEs camped therein, which may reduce the resource blocks available to allocate to other UEs in the respective cells. However, if one or more of the D2D peer UE(s) that are present within an overlap region between the different cells were to perform a forced reselection or otherwise move to the same cell as the other peer UE(s) associated with the D2D connection, the eNB in the original cell could allocate more resource blocks to other UEs in the original cell that are not involved in the D2D communication (i.e., from the resource blocks that no longer need to be allocated to the UE(s) that moved away from the original cell) such that the other UEs that are still in the original cell may experience higher data dates and/or throughput.

Referring now to FIG. 4, the uplink (UL) frame structure 400 in LTE may partition the available resource blocks on the UL into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure may result in the data section including contiguous subcarriers, which may allow a single UE to be assigned all of the contiguous subcarriers in the data section.

A UE may be assigned resource blocks 410, 412 in the control section to transmit control information to an eNB. The UE may also be assigned resource blocks 420, 422 in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 may carry a random sequence and may not carry any UL data/signaling. In an aspect, a RACH sequence may be reserved for communications of ACK/NACK information from a UE while in idle mode. Each random access preamble may occupy a bandwidth corresponding to six consecutive resource blocks. The starting frequency may be specified by the network. That is, the transmission of the random access preamble may be restricted to certain time and frequency resources. There may be no frequency hopping for the PRACH. The PRACH attempt may be carried in one subframe (1 ms) or a few contiguous subframes and a UE may make only a single PRACH attempt per frame (10 ms).

In context with the above-mentioned scenario(s) where two or more LTE-D peer UEs are camped onto different cells and therefore have one or more inter-cell LTE-D connections, performing D2D signal measurements and maintaining the LTE-D connection may be difficult, especially when the respective cells to which the LTE-D peers are attached are not synchronized. Moreover, the inter-cell LTE-D connection may result in additional UL signaling traffic because multiple cells are involved in the signal measurements that the respective peer UEs need to perform in order to maintain the D2D connection. However, if one peer UE were to perform a forced reselection or otherwise move to the neighboring cell (i.e., the cell to which the other peer UE is attached), the inter-cell D2D connection becomes an intra-cell D2D connection such that only one cell is involved in the signal measurements that the respective peer UEs perform to maintain the D2D connection because the peer UEs would be attached to the same cell. Accordingly, any synchronization issues and/or other problems that may have existed due to the peer UEs being camped onto different cells may be substantially eliminated and the LTE-D peer UEs may perform the necessary D2D measurements and maintain the LTE-D connection more easily. Furthermore, maintaining the D2D connection according to the approach whereby one or more peer UEs perform a forced reselection to the same cell as the other peer UE(s) such that the peer UEs may each be attached to the same cell and thereby efficiently use D2D communications, offload certain UL and DL data traffic from the cellular network (e.g., in the original cell(s)), attain higher throughputs, and further permit other UEs in the cellular network to attain higher throughputs.

Figure 5:
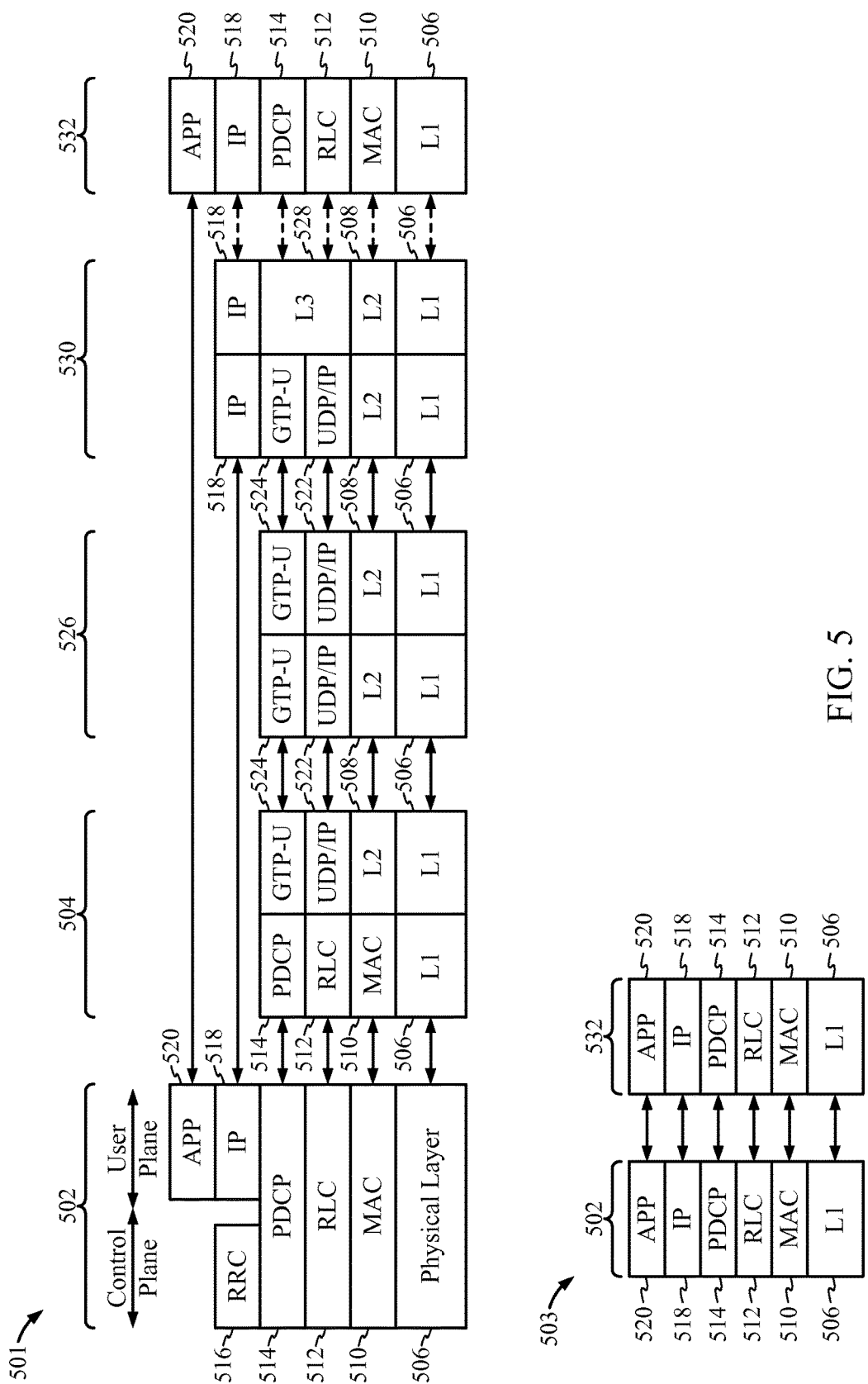
FIG. 5 illustrates an exemplary user plane and control plane radio protocol architecture, according to various aspects.

According to various aspects, FIG. 5 illustrates an exemplary user plane and control plane radio protocol architecture 501 for the user and control planes in LTE to support radio communication between a UE 502 and a UE 532 via an eNB 504, SWG 526, and PDN Gateway 530. Furthermore, in various embodiments, those skilled in the art sill appreciate that substantially the same and/or similar signaling to that described herein may occur between an eNB, SWG, and PDN Gateway supporting UE 532 (not shown). In various embodiments, the UE 502 shown in FIG. 5 may correspond to UE 102 and UE 532 may correspond to UE 104 as depicted in FIG. 1. In a similar respect, eNB 504 may correspond to eNB 112 in FIG. 1, SWG 526 may correspond to SWG 126 in FIG. 1, and PDN Gateway 530 may correspond to PDN Gateway 128 in FIG. 1. As noted above, further entities that are not shown in FIG. 5 may be present to convey user plane signaling between PDN Gateway 530 and UE 532 (e.g., an eNB, SWG, PDN Gateway, etc.).

In various embodiments, the radio protocol architecture 501 for the UE 502 and the eNB 504 is shown with three layers: Layer 1, Layer 2, and Layer 3. Communication of data/signaling may occur between UE 502 and eNB 504 across the three layers. Layer 1 506 (L1 layer) is the lowest layer and implements various physical layer signal processing functions. The L1 layer may also be referred to as the physical layer 506. Layer 2 (L2 layer) is above the physical layer 506 and is responsible for the link between the UE 502 and eNB 504 over the physical layer 506.

In the user plane associated with UE 502, the L2 layer includes a media access control (MAC) sublayer 510, a radio link control (RLC) sublayer 512, and a packet data convergence protocol (PDCP) 514 sublayer, which are terminated at the eNB on the network side. The UE 502 may have several upper layers above the L2 layer 508 including a network layer (e.g., IP layer) that may correspond to a layer 3 and that is terminated at the PDN Gateway 530 on the network side, and an application layer 520 that is terminated at the other end of the connection (e.g., far end UE 532, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations. In an operational aspect, user plane signaling from UE 502 (e.g., MAC 510 layer signaling, RLC 512 layer signaling and PDCP 514 layer signaling) may be conveyed across the network using other protocol layers such as some level 2 (L2) protocol 508, a user datagram protocol/IP (UDP/IP) 522 and general packet radio service (GPRS) tunneling protocol—user plane (GTP-U) 524.

FIG. 5 further illustrates an example radio protocol architecture 503 for the user plane in LTE to support direct radio communication between a UE 502 and UE 532. In an aspect, each layer (e.g., 520, 518, 514, 512, 510, and 506) associated with UE 502 may communicate directly with the corresponding layers associated with UE 532 and may be the same layers used to communicate between a UE and eNB in network mode as described for radio protocol architecture 501.

In the control plane, the radio protocol architecture for the UE and eNB is substantially the same for the physical layer 506 and the L2 layer with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB 504 and the UE 502.

Figure 6:
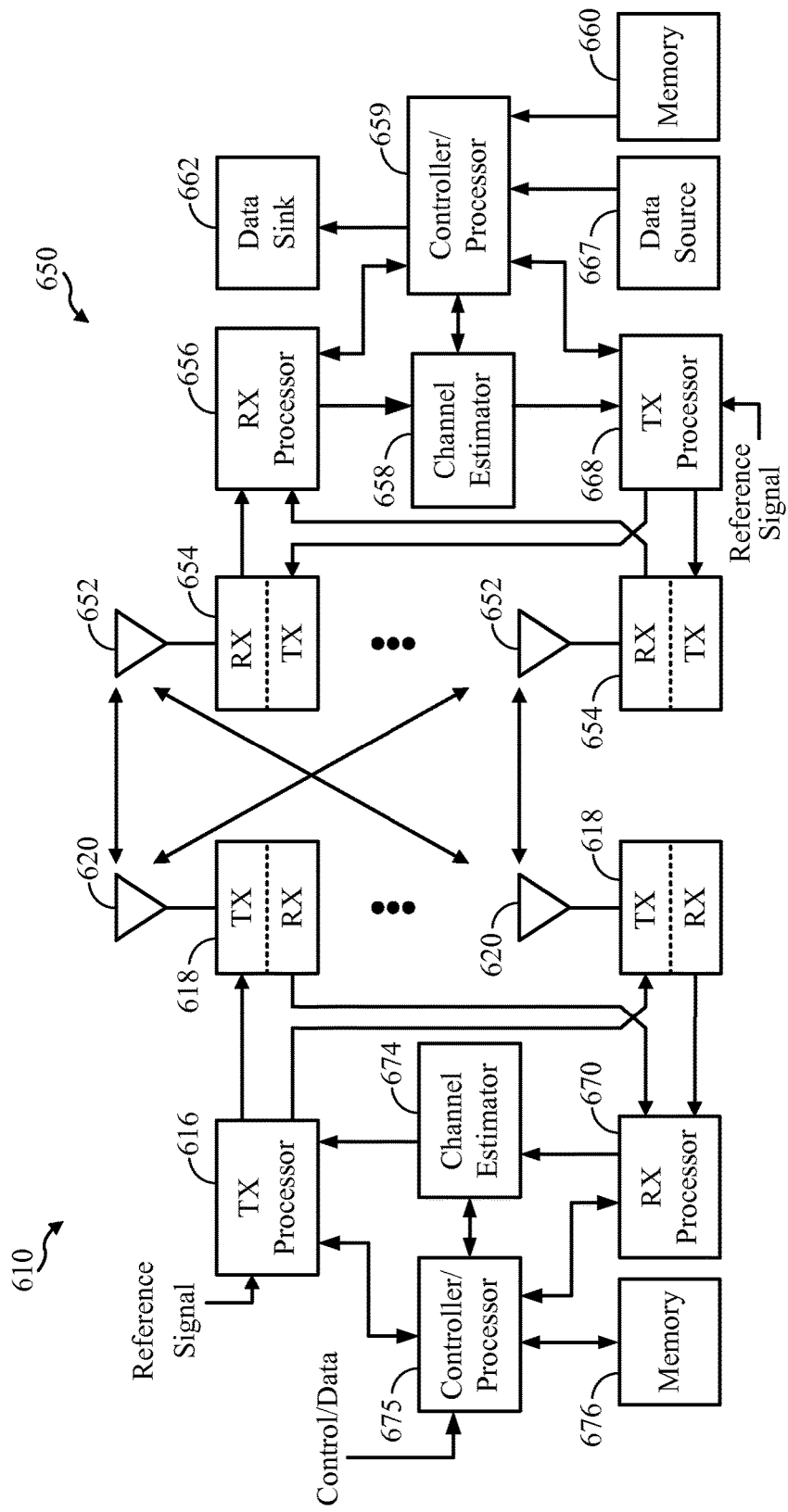
FIG. 6 illustrates an exemplary evolved Node B (eNB) and user equipment (UE) in an access network, according to various aspects.

According to various aspects, FIG. 6 illustrates an exemplary LTE network entity (e.g., eNB, MME, PDN Gateway, CSCF, etc.) 610 in direct or indirect communication with an exemplary UE 650, wherein the UE 650 may be UE 102 or 104 in FIG. 1 and the LTE network entity 610 may be any of the entities associated with the E-UTRAN 110, EPC 120, etc. in FIG. 1. On the downlink (DL), upper layer packets from the core network are provided to a controller/processor 675 that implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter TX 618. Each transmitter TX 618 modulates an RF carrier with a respective spatial stream for transmission.

At the UE 650, each receiver RX 654 receives a signal through a respective antenna 652. Each receiver RX 654 recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the LTE network entity 610. These soft decisions may be based on channel estimates computed by the channel estimator 658. The soft decisions are then decoded and deinterleaved to recover the data and control signals that were originally transmitted by the LTE network entity 610 on the physical channel. The data and control signals are then provided to the controller/processor 659.

The controller/processor 659 implements the L2 layer, wherein the controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL direction, a data source 667 in UE 650 is used to provide upper layer packets to the controller/processor 659. The data source 667 represents all protocol layers above the L2 layer. Similar to the functionality described in connection with the DL transmission by the LTE network entity 610, the controller/processor 659 implements the L2 layer for the user plane and the control plane by providing header compression, ciphering, packet segmentation and reordering, and multiplexing between logical and transport channels based on radio resource allocations by the LTE network entity 610. The controller/processor 659 is also responsible for HARQ operations, retransmission of lost packets, and signaling to the LTE network entity 610.

Channel estimates derived by a channel estimator 658 from a reference signal or feedback transmitted by the LTE network entity 610 may be used by the TX processor 668 to select the appropriate coding and modulation schemes, and to facilitate spatial processing. The spatial streams generated by the TX processor 668 are provided to different antenna 652 via separate transmitters TX 654. Each transmitter TX 654 modulates an RF carrier with a respective spatial stream for transmission.

The UL transmission is processed at the LTE network entity 610 in a manner similar to that described in connection with the receiver function at the UE 650. Each receiver RX 618 receives a signal through a respective antenna 620. Each receiver RX 618 recovers information modulated onto an RF carrier and provides the information to a RX processor 670. The RX processor 670 may implement the L1 layer.

The controller/processor 675 implements the L2 layer, wherein the controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
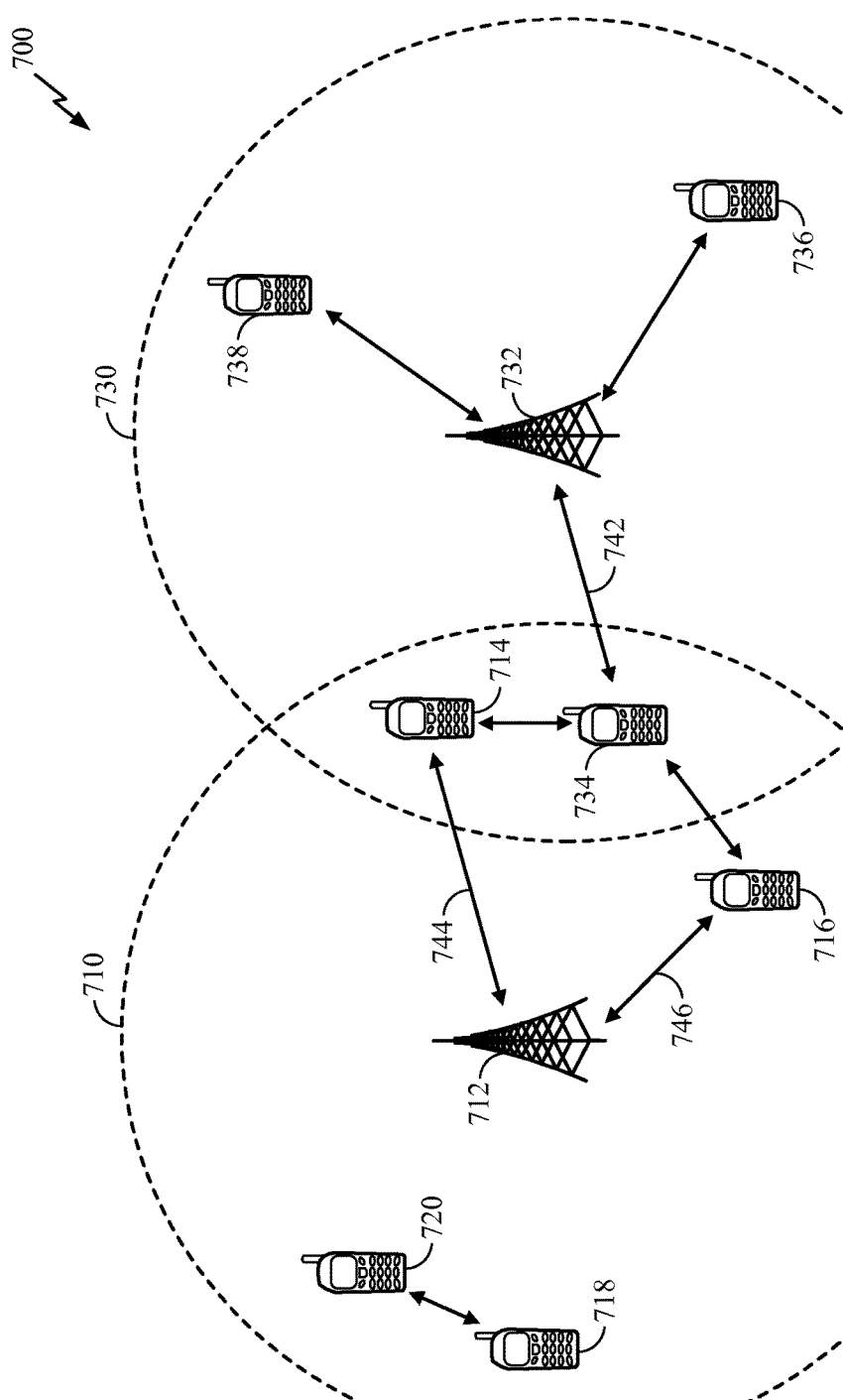
FIG. 7A and FIG. 7B illustrate an exemplary wireless network in which cell reselection may be forced at a UE engaged in a D2D communication session to improve D2D communication, according to various aspects.
Figure 7B:
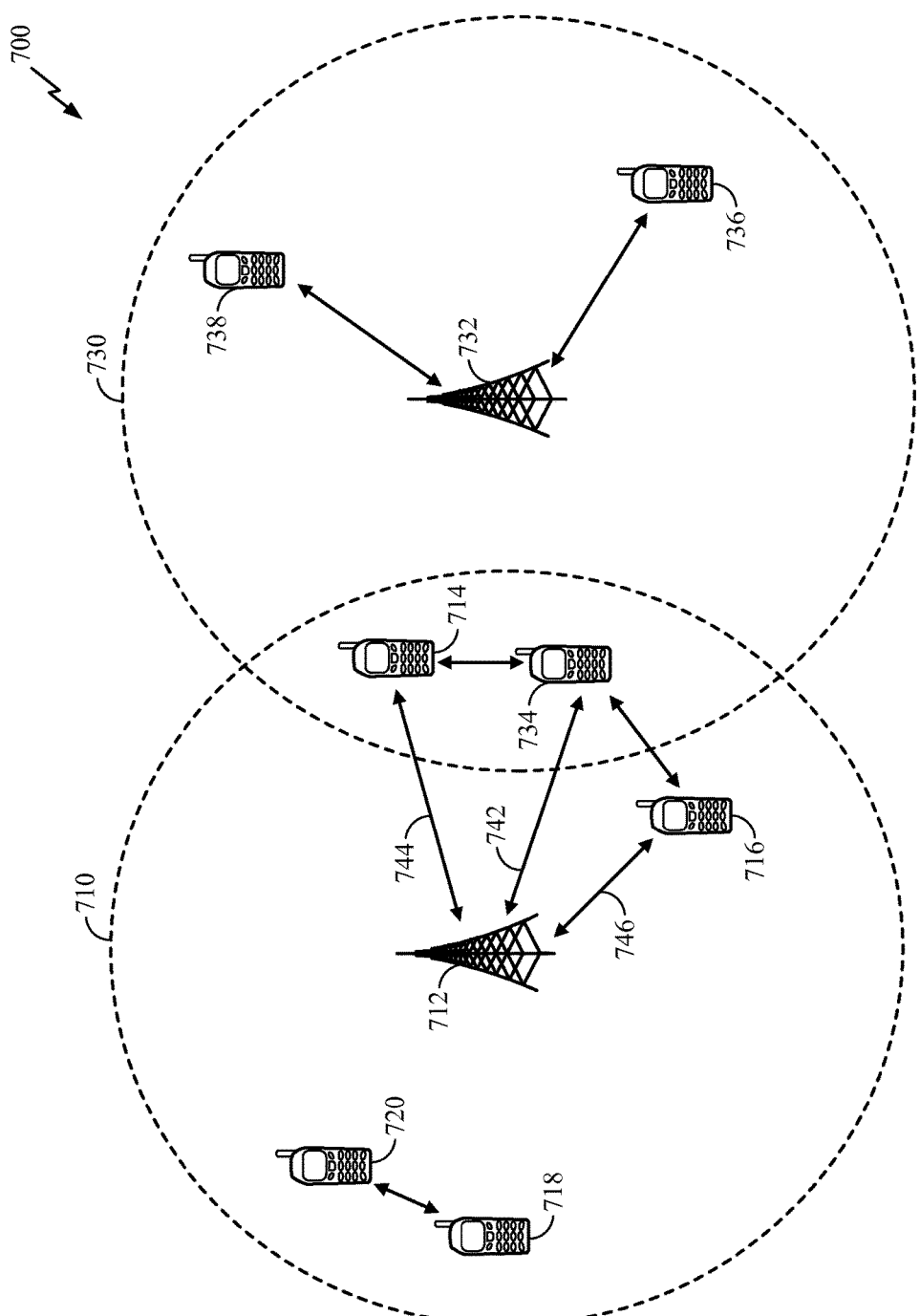

According to various aspects, FIG. 7A and FIG. 7B illustrate an exemplary wireless network 700 in which forced cell reselection may be triggered at a UE engaged in a D2D communication session to improve D2D communication, wherein the forced reselection procedure may have particular application in a network 700 that supports LTE Direct D2D communication. In particular, as described above, LTE Direct (LTE-D, sometimes referred to as "LTE-Advanced") is a proposed 3GPP (Release 12) device-to-device (D2D) solution for proximate discovery. LTE-D dispenses with location tracking and network calls by directly monitoring for services on other LTE-D devices within a large range (~500 m, line of sight), doing so continuously in a synchronous system that offers battery efficiency and the ability to concurrently detect thousands of services in proximity. LTE-D has a wider range than other D2D P2P technologies, such as Wi-Fi Direct (WFD) or Bluetooth, and operates on licensed spectrum as a service to mobile applications. LTE-D is a D2D solution that enables service layer discovery and also D2D communication, wherein mobile applications on LTE-D devices can instruct LTE-D to monitor for mobile application services on other devices and announce locally available services (for detection by services on other LTE-D devices) at the physical layer, which allows the applications to close while LTE-D does the work in a substantially continuous manner and notifies the client application when a match to a "monitor" established by an associated application is detected. For example, the application can establish a monitor for "tennis events" and the LTE-D discovery layer can wake-up the application when a tennis-related LTE-D message is detected. LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D generally uses "Expressions" to both discover proximate peers and facilitate communication between proximate peers. Expressions at the application layer and/or the service layer are referred to as "Expression Names" (e.g., ShirtSale@Gap.com, Jane@Facebook.com, etc.), wherein Expression Names at the application layer and/or the service layer are mapped to bit-strings referred to as "Expression Codes" at the physical layer. In one example, each Expression Code can have a 192-bit length (e.g., "11001111 . . . 1011", etc.). As will be appreciated, any reference to a particular Expression can refer to the associated Expression Name, Expression Code, or both, depending on context, and furthermore, Expressions can be either Private or Public based on the mapping type. As such, Public Expressions are made public and can be identified by any application, whereas Private Expressions are targeted for specific audiences. Discovery in LTE-D operates in a synchronous manner based on parameters that are configured by the LTE network. For example, frequency division duplexing (FDD) and/or time division duplexing (TDD) may be assigned by a serving eNB via a Session Information Block (SIB). The serving eNB can also configure an interval at which LTE-D devices to are announce themselves (e.g., every 20 seconds, etc.) via a transmission of a Service Discovery (or P2P Discovery) message. For example, for a 10 MHz FDD system, the eNB can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

In at least one embodiment, after two or more LTE-D devices discover each other and wish to establish an LTE-D session for communication, the LTE network may be required to authorize establishment of the LTE-D session, referred to herein as network assisted connection setup. If the LTE network authorizes the LTE-D session, the actual media is exchanged via D2D communication between the LTE-D devices, wherein peer LTE-D capable devices may use Expressions to discover proximate services, applications, and context and establish direct communications in an efficient manner.

Figure 8:
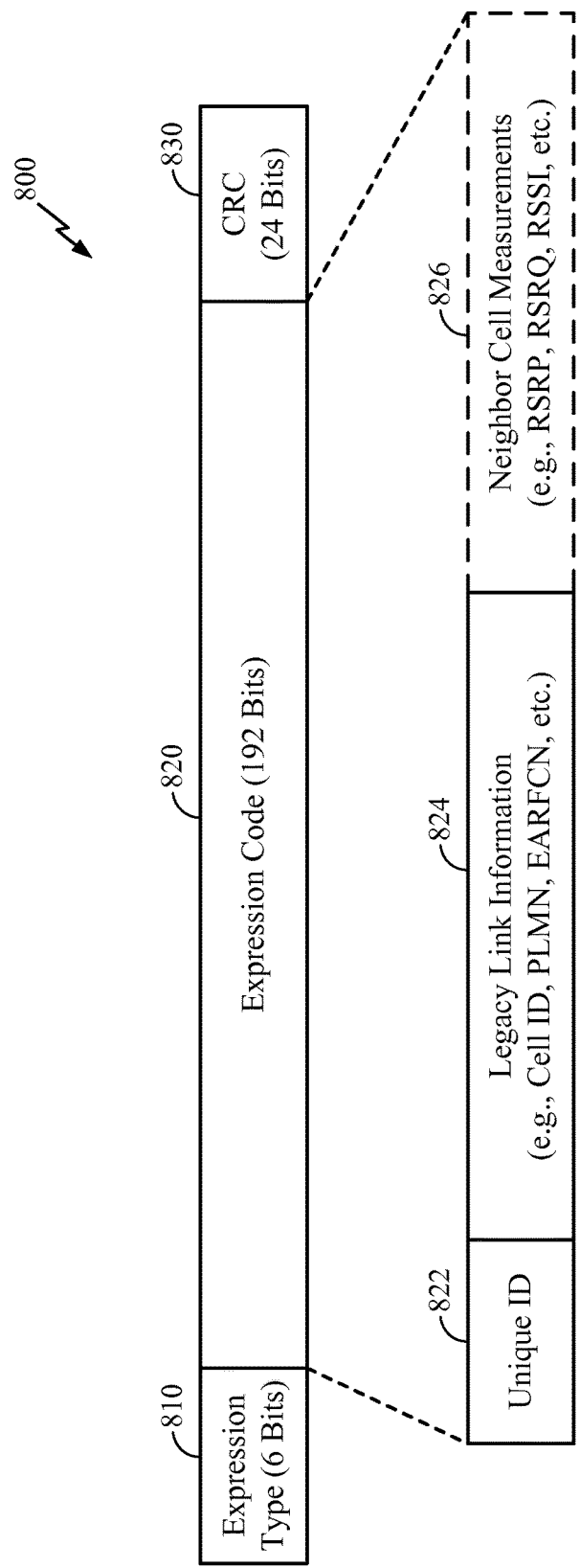
FIG. 8 illustrates an exemplary LTE Direct (LTE-D) Expression that may be discovered and used to force cell reselection at a UE engaged in a D2D communication session to improve D2D communication, according to various aspects.

For example, FIG. 8 illustrates an exemplary structure associated with an LTE-D Expression 800 that two or more LTE-D devices may broadcast such that the LTE-D devices can discover one another and establish an appropriate LTE-D session for D2D communication. In various embodiments, each LTE-D device may broadcast and/or discover the LTE-D Expression 800 at periodic intervals (e.g., every twenty (20) seconds), wherein the serving eNB(s) associated therewith may configure the periodic interval via a Service Discovery message, a P2P Discovery message, or another suitable message. In various embodiments, as shown in FIG. 8, the LTE-D Expression 800 may include an Expression type field 810 having six (6) bits, an Expression code field 820 having 192 bits, and a cyclic redundancy check (CRC) field 830 having twenty-four (24) bits. In general, the Expression type field 810, the Expression code field 820, and the CRC field 830 may be encoded as a single coding block through a convolutional encoder. Furthermore, in various embodiments, the Expression code field 820 may comprise a Unique Identifier 822 associated with the broadcasting LTE-D device and one or more content fields that can include other suitable data. For example, in an LTE-D network such as the wireless network 700 shown in FIG. 7A, certain measurement issues may arise when two or more D2D peer UEs are camped onto different base stations (i.e., attached to different cells) and at least one D2D peer is located in a cell overlap region, which may lead to difficulties in maintaining the D2D link between and/or among the two or more peer UEs such that the proximity services between the two or more peer UEs may be lost.

Accordingly, in various embodiments, the content fields in the LTE-D Expression 800 shown in FIG. 8 may include a legacy link information field 824 that includes the cell information associated with the broadcasting peer UE (e.g., a Cell ID, a public land mobile network (PLMN), an E-UTRA Absolute Radio Frequency Channel Number (EARFCN), etc.) such that the other peer UE may discover the broadcasted LTE-D Expression 800 and learn the cell information associated with the broadcasting peer UE based on the legacy link information field 824 contained therein. Furthermore, in various embodiments, the content fields in the LTE-D Expression 800 may optionally include one or more neighbor cell measurements 826 in the event that the broadcasting peer UE is located in an overlap region between the serving cell associated therewith and the neighboring cell to which the other peer UE is attached. For example, in various embodiments, the neighbor cell measurements 826 may include a reference signal received power (RSRP), a reference signal received quality (RSRQ), a received signal strength indicator (RSSI), etc. associated with one or more signals that the broadcasting peer UE observed in the neighbor cell. As such, where the LTE-D peer UEs are attached to different cells and at least one D2D peer is located in the cell overlap region, the LTE-D peer UEs may exchange LTE-D Expressions 800 having the structure shown in FIG. 8 and use the legacy link information 824 and the neighbor cell measurements 826 contained therein to coordinate a forced reselection procedure whereby one peer UE moves to the same cell as the other peer UE.

For example, in the event that multiple peer UEs are located in the cell overlap region and observe energy above a particular reselection threshold value on the respective neighbor cells, the forced cell reselection may be triggered at the peer UE(s) that obtain the stronger neighbor cell measurement(s) 826. In another example, where the legacy link information 824 indicates that one or more of the peer UEs that are located in the cell overlap region have an active legacy link and the other peer UE(s) have inactive legacy links, the forced cell reselection may be triggered at the peer UE(s) with the inactive legacy link(s). In still another example, where several peer UEs that are attached to different cells are involved in the D2D connection and more than one of the peer UEs are located in the overlap region(s)

between the different cell, the appropriate target cell to which the forced reselection is performed may depend on how many peer UEs are camped on the respective cells (e.g., in a D2D connection involving ten UEs that include eight UEs attached to a first cell and two UEs attached to a second cell, the forced reselection may be triggered at the two UEs attached to the second cell because having the two UEs force reselection to the first cell may be substantially easier than having the eight UEs attached to the first cell force reselection to the second cell). In other words, depending on how many UEs are involved in the inter-cell D2D connection, how many D2D peer UEs are present in the respective cells, and/or how many D2D peer UEs are present in the overlap region(s) between the different cells and therefore represent suitable candidates to perform the forced cell reselection, the forced reselection may be triggered at the appropriate peer UE(s) to minimize the number of peer UE(s) that need to perform the forced reselection and/or maximize the number of peer UE(s) that will be attached to the same cell once the forced reselection is successfully carried out. Furthermore, those skilled in the art will appreciate other examples and/or use cases with respect to how the D2D peer UE(s) may use the information contained in the LTE-D Expression(s) 800 to negotiate or otherwise coordinate the peer UE(s) that perform the forced reselection based on the description provided herein.

For example, referring again to FIG. 7A, a first UE 734 camped onto a first eNB 732 in a first cell 730 may have an LTE-D connection with a second UE 714 camped onto a second eNB 712 in a second cell 710, wherein the first UE 734 and the second UE 714 are both located in an overlap region between the first cell 710 and the second cell 730. In a similar respect, the first UE 734 may have another LTE-D connection with a third UE 716 also camped onto the second eNB 712 in the second cell 710, except that only the first UE 734 is located in the overlap region between the first cell 710 and the second cell 730. Nonetheless, similar (intra-cell) measurement difficulties may arise in each scenario. In particular, the various D2D peer UEs 734, 714, 716 may generally be required to measure a known signature transmitted from each D2D peer (e.g., sequence, signal pattern, etc.) and report the measured signature to the D2D peer and to a respective serving eNB in order to maintain the D2D link (e.g., the first eNB 732 in the case of the first UE 734 and the second eNB 712 in the case of the D2D peer UEs 714, 716 associated therewith). In general, when two or more D2D peer UEs are attached to the same cell (e.g., as shown in FIG. 7A where D2D peer UEs 718, 720 are camped onto the eNB 712 in cell 710), the D2D peer UEs may be synchronized and obtain measurements relatively easily (i.e., because the measurements are intra-cell measurements). However, where two or more D2D peer UEs are attached to different cells, as with D2D peer UEs 714, 734 and D2D peer UEs 716, 734 and one or more of the D2D peer UEs are in the cell overlap region, the measurements needed to maintain the D2D link become inter-cell measurements that are generally more difficult to obtain (e.g., especially when the cells 710, 730 are not synchronized). Accordingly, when (i) two or more D2D peers are camped onto different eNBs or otherwise attached to different cells and (ii) one or more of the D2D peers are located in an overlap region between the cells, difficulties in obtaining the inter-cell measurements may interfere with maintaining the D2D link between the D2D peers and proximity services between the D2D peers may be lost. As a consequence, with reference to FIG. 7A, the D2D peer UEs 714, 716, 734 that lose proximity service benefits will have to use legacy links with the eNBs 712, 732 with respect to both data and signaling transmission, as depicted at 742, 744, 746. As such, the scenario(s) shown in FIG. 7A may result in unnecessary resource consumption at the eNBs 712, 732, and moreover, the UEs 714, 716, 734 may suffer from faster battery drain (among other negative consequences) due to the need to transmit at a high power to close the loop with the eNB 712, 732.

Accordingly, to address the above-mentioned problems and thereby improve D2D performance over LTE-D, a forced cell reselection may be dynamically triggered at one D2D peer UE such that the D2D peer UEs are camped onto the same eNB (i.e., the D2D peer UE that performs the forced cell reselection may move to the cell to which the other D2D peer UE is attached). As such, even though one or more D2D peer UEs may still be located in the cell overlap region, the D2D peers are all camped onto the same eNB and attached to the same cell such that the easier intra-cell measurements can be obtained and the D2D link can be maintained such that the D2D peers can continue to avail the proximity services associated with one another (subject to the D2D peers remaining within sufficient proximity to each other). For example, referring to FIG. 7B, the forced cell reselection may be triggered at the peer UE 734 that had been camped onto the eNB 732 in cell 730 such that the peer UE 734 has moved over to the eNB 712 in cell 710, whereby D2D peers 716, 734 are now intra-cell D2D peers and D2D peers 714, 734 are likewise intra-cell D2D peers. However, those skilled in the art will appreciate that where multiple D2D peers are located in the cell overlap region (e.g., as with D2D peers 714, 734), the forced cell reselection may only be triggered at the D2D peer(s) located in one cell and the other D2D peer(s) that are located in the other cell (i.e., the target cell associated with the forced reselection) may continue undisturbed, as forcing cell reselection at each D2D peer may result in the same problem except in the reverse. Furthermore, those skilled in the art will appreciate that where one or more D2D peers are located in the cell overlap region and one or more D2D peers are located outside the cell overlap region (e.g., as with D2D peers 716, 734), the forced cell reselection may be triggered at the D2D peer(s) located in the cell overlap region and the other D2D peer(s) may continue undisturbed, as the D2D peer(s) outside the cell overlap region may not have the ability to observe sufficient energy (if any) on the new cell and survive on the new cell without issues. In that sense, a cell reselection threshold $M_{TH}$ may be maintained as a safeguard to control the decision about whether to force cell reselection, where the threshold $M_{TH}$ may have an implementation-specific value.

For example, in various embodiments, the cell reselection threshold $M_{TH}$ may have an implementation-specific value that depends on a reference signal received power (RSRP) associated with one or more signals that one or more D2D peers observe in the respective neighbor cells. More particularly, the RSRP may be considered an important parameter that conveys the signal strength associated with a cell and typically ranges from about −44 dbm to −130 dbm. Accordingly, in one example, the cell reselection threshold $M_{TH}$ could have a −90 dBm value, meaning that forced cell reselection may only be triggered to a cell having a RSRP value greater than −90 dBm. Furthermore, in various embodiments, base station performance may vary from time to time according to user loads (e.g., during peak hours, the base station may be heavily loaded and interference may be high, which can heavily impact reference signal received quality (RSRQ). Accordingly, because the RSRQ parameter indicates the interference levels and might vary from time to time according to user loads, the cell reselection threshold $M_{TH}$ may be further adjusted to depend upon base station performance (e.g., the base station user load) according to the RSRQ parameter.

In one example operational aspect, with reference to FIG. 7A and FIG. 7B, the UEs operating in D2D mode (i.e., UEs 714, 716, 734, 718, 720) have the ability to broadcast information to D2D peers associated therewith and therefore have the ability to exchange certain information (e.g., Cell ID, public land mobile network (PLMN), E-UTRA Absolute Radio Frequency Channel Number (EARFCN), etc.). As such, in various embodiments, any D2D peer located in the cell overlap region may force reselection to the cell associated with the other D2D peer(s), depending on which cell may be more a feasible reselection target under the circumstances. For example, in various embodiments, where more than one D2D peer measures sufficient energy on the other (neighbor) cell that exceeds the safeguard cell reselection threshold $M_{TH}$, the forced reselection may be triggered at the D2D peer(s) that measured more energy from the neighboring cell and would therefore have a stronger (new) legacy link. Alternatively, where one or more D2D peers measure energy on the neighbor cell that exceeds the safeguard threshold $M_{TH}$ and the other(s) measure energy on the neighbor cell that does not exceed the safeguard threshold $M_{TH}$, the forced reselection may be triggered at the D2D peer(s) that measured sufficient energy to survive the move to the neighboring cell. However, those skilled in the art will appreciate that the forced cell reselection can be triggered provided that at least one D2D peer observes energy on both the current cell associated therewith and the neighbor cell associated with the D2D peer(s). In various embodiments, after the forced cell reselection has been carried out and the D2D peer 734 has moved to the same cell 710 as D2D peers 714, 716, the D2D peers 714, 716, 734 may perform intra-cell measurements such that the D2D link between the D2D peers 714, 734 and the D2D link between the D2D peers 716, 734 may be maintained relatively easily.

According to various aspects, the forced cell reselection procedure described above may therefore be triggered based on certain conditions and UE states that may exist at any particular time to prevent losing connectivity via legacy links 742, 744, 746. For example, in various embodiments, forced cell reselection may not be triggered at any D2D peer UE that has an active legacy data connection with a current cell at a particular time (i.e., the D2D peer UE is actively exchanging data with the eNB in the current cell). In that sense, connectivity with the eNBs 712, 732 via legacy links 742, 744, 746 may be considered primary and D2D connectivity may be considered secondary. Furthermore, as mentioned above, an implementation-specific safeguard threshold $M_{TH}$ may be maintained to control the decision about whether to force cell reselection, wherein a D2D peer UE may only move to a new cell when the D2D peer UE observes energy on the new cell that exceeds the safeguard threshold $M_{TH}$ and can therefore survive on the new cell without issues. In various embodiments, the measured or otherwise observed energy on the new cell and the safeguard threshold $M_{TH}$ may be based on any suitable communication parameters (e.g., a reference signal received power (RSRP), a reference signal received quality (RSRQ), a received signal strength indicator (RSSI), etc. associated with one or more signals that are received from the eNB in the new cell). Further still, if a D2D peer UE moves to a new cell to ease the D2D communication, the D2D peer UE may still have the capability (or freedom) to fall back to the original cell at any particular time via legacy cell reselection algorithms running in the background.

Accordingly, the forced cell reselection algorithm described above may essentially transform an inter-cell D2D connection into an intra-cell D2D connection, which may facilitate easier D2D communication without hampering the performance, connectivity, or benefits associated with legacy cellular links. As such, the forced cell reselection algorithm may enable efficient communication between D2D peers without consuming substantial eNB and/or network resources, whereby the eNBs could allocate more resource blocks to other users in the same network such that the other users may achieve higher throughput. For example, referring again to FIG. 7B, UEs 736, 738 that are not within sufficient proximity to establish an LTE-D link may be allocated more resource blocks from the eNB 732 after the D2D peer UE 734 performs forced cell reselection to eNB 712. Further benefits from the forced cell reselection algorithm may include reduced battery consumption at the D2D peer UE(s), which should be able to use less transmit power to close the loop with nearby UEs after the forced cell reselection has been carried out, which may be especially important on smartphones and other power-hungry devices.

Figure 9:
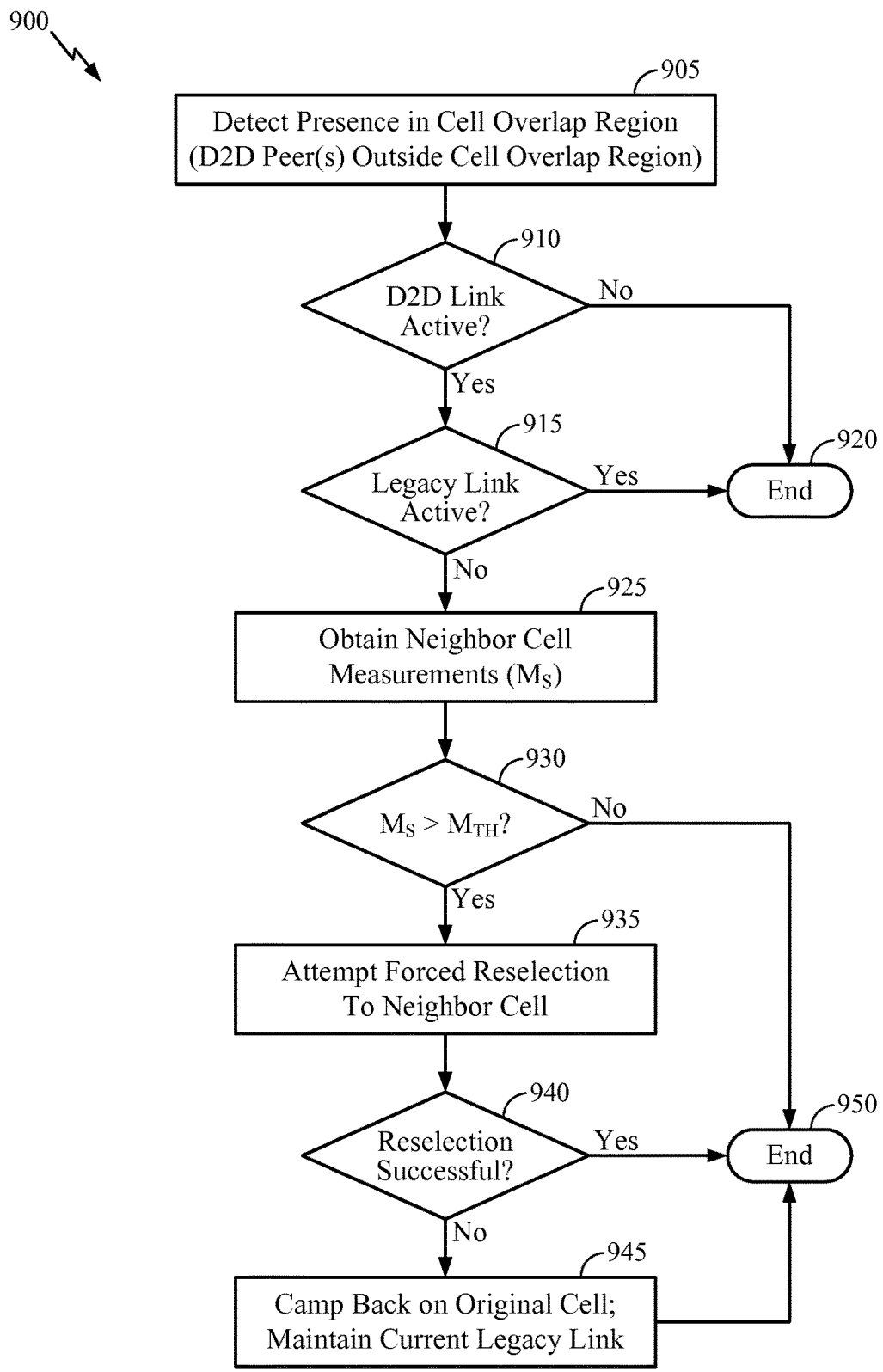
FIG. 9 illustrates an exemplary method to force cell reselection at a UE engaged in a D2D communication session to improve D2D performance in a scenario where the UE is located in a cell overlap region, according to various aspects.

According to various aspects, FIG. 9 illustrates an exemplary method 900 to force cell reselection at a UE engaged in a D2D communication session to improve D2D performance in a scenario where the UE is located in a cell overlap region. In general, the method 900 may generally comprise an algorithm corresponding to a forced cell reselection procedure that may be performed where a particular UE is camped on a first base station has one or more D2D connections with one or more peer UEs that are camped onto different base stations or otherwise attached to different cells (i.e., the UE has one or more inter-cell D2D connections). In various embodiments, the forced reselection may be started at block 905 in response to the UE detecting that the UE is present or otherwise located in an overlap region between the respective cells to which the D2D peers are attached and further that the other D2D peer(s) are outside the cell overlap region. Furthermore, note that the scenario(s) in which more than one D2D peer is located in the cell overlap region will be described below with reference to FIG. 10.

In various embodiments, in response to determining that one or more triggering criteria to start the forced cell reselection procedure are met (e.g., that the UE is located in the cell overlap region and camped onto a different base station than one or more peer UEs), certain conditions and UE states that may exist at any particular time may then be checked to determine whether or not to trigger the forced cell reselection. For example, a check may be performed at block 910 to determine whether the inter-cell D2D connection is active, wherein the forced cell reselection procedure may end at block 920 in the event that the inter-cell D2D connection is inactive (e.g., because there may not be any active proximity services that need to be maintained). However, if the inter-cell D2D connection is active such that there are one or more active proximity services to maintain, a further check may be performed at block 915 to determine whether the UE has an active legacy link in which an ongoing data transfer may be occurring over a primary data connection with the original cell. As such, the forced cell reselection procedure may also end at block 920 in the event that the UE has an active legacy link with the original cell because connectivity with the eNB in the original cell via the active legacy link may be considered primary and the D2D connectivity may be considered secondary. Otherwise, if the inter-cell D2D connection is active and the legacy link is inactive, the forced cell reselection procedure may proceed as described herein.

More particularly, at block 925, the UE in the cell overlap region may obtain one or more measurements $M_S$ on the neighboring cell in which the D2D peer is camped, wherein the one or more measurements $M_S$ may comprise a reference signal received power (RSRP), a reference signal received quality (RSRQ), a received signal strength indicator (RSSI), and/or other suitable communication parameters associated with one or more signals received at the UE from the eNB in the neighboring cell. The measurements $M_S$ obtained on the neighboring cell may then be compared to an implementation-specific safeguard threshold $M_{TH}$ at block 930, wherein the safeguard threshold $M_{TH}$ may be maintained to control the decision about whether to trigger the forced cell reselection. Accordingly, in response to determining that the measurements $M_S$ obtained on the neighboring cell do not exceed the safeguard threshold $M_{TH}$ at block 930, the forced cell reselection procedure may end at block 950 (e.g., because the UE may only move to a new cell when sufficient energy is observed on the neighboring cell such that the UE can survive on the neighboring cell without issues). However, in the event that the measurements $M_S$ obtained on the neighboring cell exceed the safeguard threshold $M_{TH}$, reselection to the neighboring cell may be forced or otherwise triggered at block 935 because the UE observed sufficient energy on the neighboring cell to survive the move. The UE may then determine whether the cell reselection succeeded at block 940, in which case the forced cell reselection procedure may end at block 950. However, as mentioned above, if the UE successfully reselects the neighboring cell to ease the D2D communication at blocks 935, 940, the UE may still have the capability (or freedom) to fall back to the original cell at any particular time via legacy cell reselection algorithms that may be running in the background. Otherwise, if the forced cell reselection did not succeed, the UE may camp back onto the original cell and maintain the current legacy link at block 945 before ending the forced cell reselection procedure at block 950.

Figure 10:
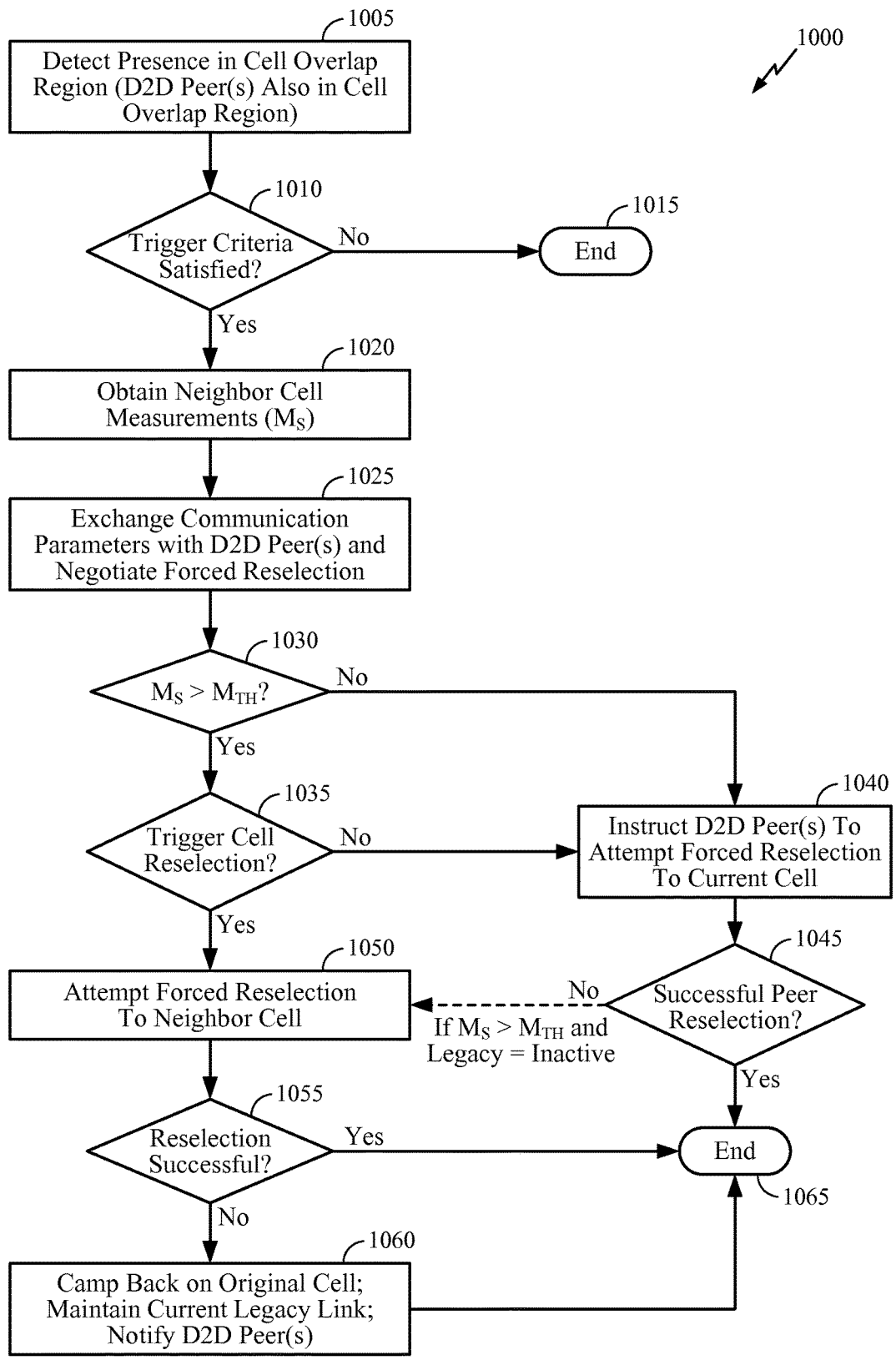
FIG. 10 illustrates another exemplary method to force cell reselection to improve D2D performance in a scenario where two or more UEs engaged in a D2D communication session are located in a cell overlap region, according to various aspects.

According to various aspects, FIG. 10 illustrates another exemplary method 1000 to force cell reselection to improve D2D performance, wherein the method 1000 shown in FIG. 10 may apply to the scenario(s) in which two or more UEs have an inter-cell D2D connection (i.e., the two or more D2D peer UEs are camped on different base stations or otherwise attached to different cells) while located in a cell overlap region. In various embodiments, the method 1000 may be performed at any such UE that detects presence in the cell overlap region (e.g., based on location, observing energy from a neighbor cell, etc.) while camped on a different base station from one or more other UEs that are involved in the inter-cell D2D connection and also present in the cell overlap region. As such, in various embodiments, the forced reselection procedure shown in FIG. 10 may be started at 1005 in response to the UE detecting presence in the cell overlap region and further detecting that at least one of the D2D peer(s) that are camped onto or otherwise attached to a different cell are also present within the cell overlap region.

In various embodiments, at block 1010, the UE may then determine whether one or more triggering criteria to start the forced cell reselection procedure are satisfied. More particularly, starting from the assumption that the UE is present in the cell overlap region while engaged in an inter-cell D2D connection with one or more peer UEs that are further present in the cell overlap region, the UE may check one or more conditions and/or states at block 1010 to determine whether or not to proceed with the forced cell reselection procedure. For example, in various embodiments, the UE may determine whether the inter-cell D2D connection is active at block 1010 and appropriately end the forced cell reselection procedure at block 1015 in the event that the inter-cell D2D connection is inactive (e.g., because there may not be any active proximity services that need to be maintained). However, if the inter-cell D2D connection is active such that there are one or more active proximity services to maintain, a further check may be performed at block 1010 to determine whether the UE has an active legacy link being used to conduct an ongoing data transfer over a primary data connection with the original cell (i.e., the cell currently serving the UE). As such, the forced cell reselection procedure may also appropriate end at block 1015 in the event that the UE has an active legacy link because connectivity with the eNB in the original cell via the active legacy link may be considered primary and the D2D connectivity may be considered secondary. Otherwise, in response to the UE determining that the inter-cell D2D connection is active and the legacy link is inactive at block 1010, the forced cell reselection procedure may proceed further as described in further detail herein.

According to various embodiments, at block 1020, the UE may obtain one or more measurements $M_S$ on the neighboring cell in which the other D2D peer(s) are camped, wherein the one or more measurements $M_S$ may comprise a reference signal received power (RSRP), a reference signal received quality (RSRQ), a received signal strength indicator (RSSI), and/or other suitable communication parameters associated with one or more signals that the UE receives or otherwise observes from the eNB in the neighboring cell. The UE may then create a private LTE-D Expression that includes the measurements $M_S$ that the UE obtained on the neighboring cell in addition to information describing the legacy link associated with the UE (e.g., a Cell ID, a public land mobile network (PLMN), an E-UTRA Absolute Radio Frequency Channel Number (EARFCN), etc.), a unique identifier associated with the UE, and/or any other suitable information that may be relevant to the forced cell reselection procedure. Furthermore, the other D2D peer UE(s) involved in the inter-cell D2D connection that are present in the cell overlap region may similarly obtain measurements on the neighboring cell (i.e., the cell on which the UE performing the method 1000 is camped) and create an appropriate private LTE-D Expression that includes at least the neighboring cell measurements that the D2D peer UE(s) obtained in addition to information describing the legacy link(s) associated therewith the UE. As such, at block 1025, the various UEs that are involved in the inter-cell D2D connection and present in the cell overlap region may then exchange (i.e., broadcast and discover) the respective private LTE-D Expressions such that each D2D peer UE performing the forced cell reselection procedure may learn the legacy link information and the neighbor cell measurements associated with one another and negotiate the appropriate D2D peer UE(s) at which to trigger the forced cell reselection.

More particularly, in various embodiments, to negotiate or otherwise select the appropriate D2D peer UE(s) at which to trigger the forced cell reselection, the neighbor cell measurement(s) that each UE obtained may be compared to the above-mentioned safeguard threshold $M_{TH}$ at block 1030, wherein the safeguard threshold $M_{TH}$ may be maintained to control the decision about whether to trigger the forced cell reselection. For example, in various embodiments, the safeguard threshold $M_{TH}$ may have a value that depends on a reference signal received power (RSRP) associated with the one or more signals received or otherwise observed in the respective neighbor cells, wherein the RSRP typically ranges from −44 to −130 dbm such that the safeguard threshold $M_{TH}$ could have a −90 dBm value in one example (e.g., a D2D peer UE that obtains measurements $M_S$ with an RSRP value greater than −90 dBm may be a suitable candidate at which to trigger the forced cell reselection). Furthermore, in various embodiments, base station performance may vary from time to time according to user load (e.g., a base station may be heavily loaded and interference may be high during peak hours, which can heavily impact reference signal received quality (RSRQ), whereby the safeguard threshold $M_{TH}$ may be further adjusted according to the RSRQ parameter that generally depends upon base station performance). Accordingly, in response to determining at block 1030 that the neighbor cell measurements $M_S$ obtained at the UE do not exceed the safeguard threshold $M_{TH}$, the UE may instruct the other inter-cell D2D peer(s) to attempt a forced reselection to the current serving cell associated with the UE at block 1040. Alternatively, in the event that the neighbor cell measurements $M_S$ obtained at the UE exceed the safeguard threshold $M_{TH}$ such that the UE may be a suitable forced reselection candidate, the negotiation may proceed to block 1035.

For example, in various embodiments, the factors that the inter-cell D2D peers consider to negotiate or otherwise select the appropriate D2D peer UE(s) at which to trigger the forced cell reselection may further depend on the respective neighbor cell measurements obtained at each inter-cell D2D peer. In the simplest use case, the forced cell reselection may be triggered at the UE executing the method 1000 where the neighbor cell measurements $M_S$ obtained at the UE exceed the safeguard threshold $M_{TH}$ and that the other inter-cell D2D peer UE(s) each obtained neighbor cell measurements that do not exceed the safeguard threshold $M_{TH}$. In another use case, where the UE and one or more other inter-cell D2D peer UEs each obtained neighbor cell measurements that exceed the safeguard threshold $M_{TH}$, the forced cell reselection may be triggered at the UE that obtained the stronger neighbor cell measurement(s). In other examples, the inter-cell D2D peers may negotiate the forced reselection at block 1035 according to the legacy link state associated therewith, wherein the forced reselection may be triggered at an appropriate D2D peer UE that has an inactive legacy link in the event that one or more D2D peers have an active legacy link. In still another example, where the inter-cell D2D communication involves several peer UEs (e.g., three or more), the target cell to which the forced reselection is performed may depend on how many inter-cell D2D peers are camped on or otherwise attached to the various cells. For example, where the current cell serving the UE has more UEs involved in the inter-cell D2D connection than the neighbor cell, the UE may instruct the D2D peer(s) in the neighbor cell to attempt a forced reselection to the current cell at block 1040 because triggering the forced reselection at the comparatively fewer UEs in the neighbor cell may be easier than having the larger number of UEs attached to the current cell force reselection to the neighbor cell. On the other hand, where the current cell has fewer UEs involved in the inter-cell D2D connection than the neighbor cell, block 1035 may comprise triggering the forced reselection at the UE for similar reasons.

Accordingly, in response to the UE instructing the D2D peer(s) in the neighbor cell to attempt to force reselection to the current cell based on the negotiation(s) performed at blocks 1025-1035, the D2D peer(s) in the neighbor cell may appropriately attempt the forced cell reselection and then send a notification to the UE to indicate whether the D2D peer(s) successfully forced reselection to the current cell serving the UE. As such, in response to the notification received from the D2D peer(s) in the neighbor cell indicating that the forced reselection to the current cell was successful at block 1045, the UE and the D2D peer(s) may each be attached to the same cell such that the inter-cell D2D connection becomes an intra-cell D2D connection and the method 1000 may then appropriately end at block 1065. However, in the event that the D2D peer(s) in the neighbor cell were unable to successfully force reselection to the current cell, the UE executing the method 1000 may attempt to force reselection to the neighbor cell at block 1050 (assuming that the neighbor cell measurements $M_S$ obtained at block 1020 exceed the safeguard threshold $M_{TH}$ and that the UE has an inactive legacy link, otherwise the method may end at block 1065 without converting the inter-cell D2D connection to an intra-cell D2D connection). In the alternative, the UE may attempt to force reselection to the neighbor cell at block 1050 based on the negotiation(s) that were performed at blocks 1025-1035, in which case the neighbor cell measurements $M_S$ obtained at block 1020 can be safely assumed to exceed the safeguard threshold $M_{TH}$ and the UE can be safely assumed to have an inactive legacy link because the D2D peer(s) would have otherwise been instructed to attempt the forced reselection at block 1040.

In either case, once the forced reselection has been triggered at the UE, block 1050 may comprise the UE attempting to force reselection to the neighbor cell and the UE may then determine whether the forced cell reselection succeeded at block 1055. In the affirmative, the UE may send a notification to the D2D peer(s) indicating that the UE successfully reselected the neighbor cell and the forced cell reselection procedure may then appropriately end at block 1065. However, as mentioned above, the UE may still have the capability (or freedom) to fall back to the original cell at any particular time via legacy cell reselection algorithms running in the background after reselecting to the neighbor cell to ease the D2D communication. Alternatively, where the forced cell reselection attempted at block 1050 was unsuccessful, the UE may camp back onto the original cell, maintain the current legacy link, and send a notification to the D2D peer(s) indicating that the UE was unable to reselect the neighbor cell prior to ending the forced cell reselection procedure at block 1065.

Figure 11:
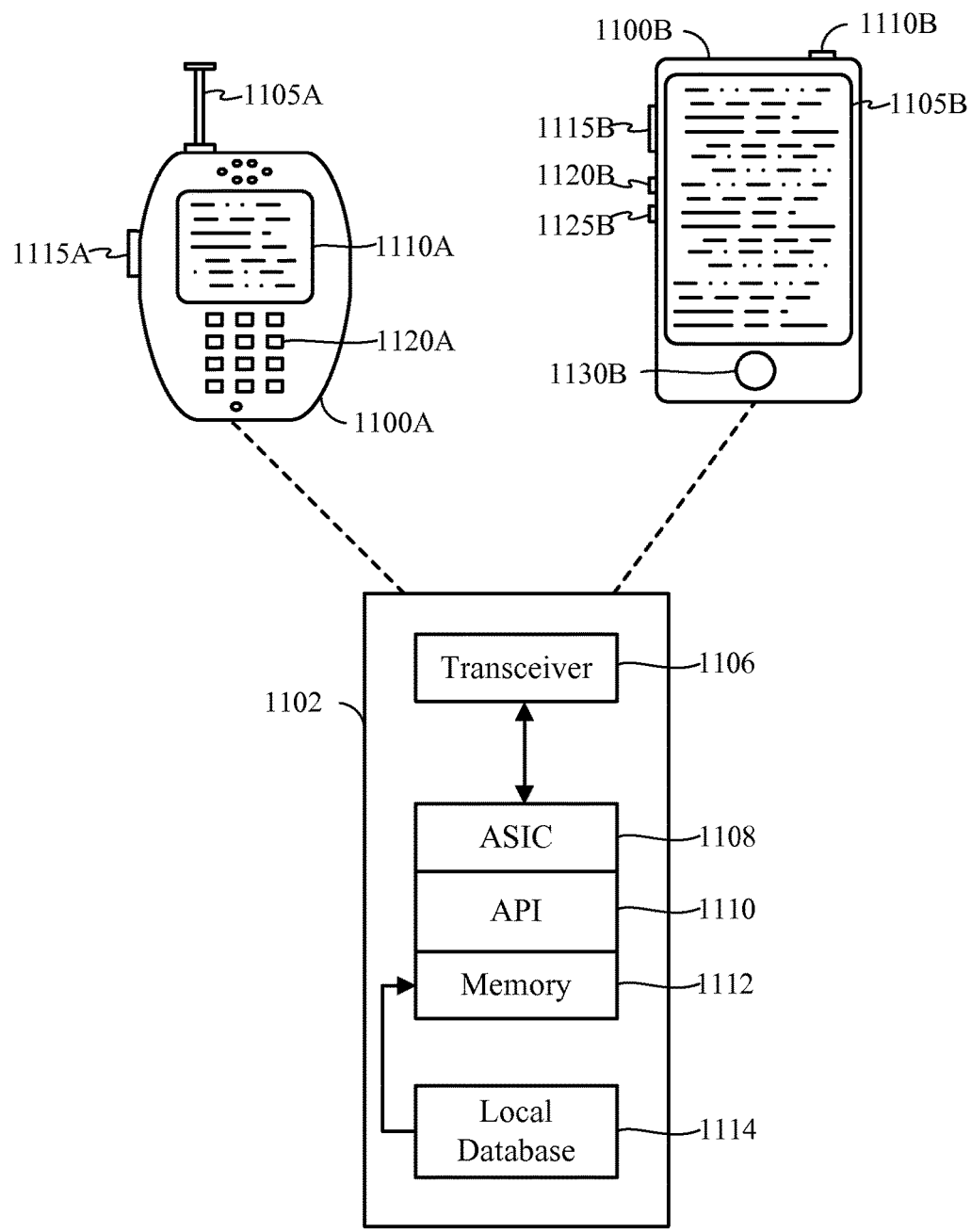
FIG. 11 illustrates exemplary UEs that may support D2D communications and forced cell reselection according to the various aspects and embodiments described herein.

According to various aspects, FIG. 11 illustrates exemplary UEs 1100A, 1100B that may support D2D communications and forced cell reselection according to the various aspects and embodiments described herein. Referring to FIG. 11, UE 1100A is illustrated as a calling telephone and UE 1100B is illustrated as a touchscreen device (e.g., a smart phone, a tablet computer, etc.). As shown in FIG. 11, an external casing of UE 1100A is configured with an antenna 1105A, display 1110A, at least one button 1115A (e.g., a PTT button, a power button, a volume control button, etc.) and a keypad 1120A among other components, as is known in the art. Also, an external casing of UE 1100B is configured with a touchscreen display 1105B, peripheral buttons 1110B, 1115B, 1120B and 1125B (e.g., a power control button, a volume or vibrate control button, an airplane mode toggle button, etc.), at least one front-panel button 1130B (e.g., a Home button, etc.), among other components, as is known in the art. While not shown explicitly as part of UE 1100B, the UE 1100B can include one or more external antennas and/or one or more integrated antennas that are built into the external casing of UE 1100B, including but not limited to Wi-Fi antennas, cellular antennas, satellite position system (SPS) antennas (e.g., global positioning system (GPS) antennas), and so on.

While internal components of UEs such as the UEs 1100A and 1100B can be embodied with different hardware configurations, a basic high-level UE configuration for internal hardware components is shown as platform 1102 in FIG. 11. The platform 1102 can receive and execute software applications, data and/or commands transmitted from the RAN 120 that may ultimately come from the core network 140, the Internet 175 and/or other remote servers and networks (e.g., application server 170, web URLs, etc.). The platform 1102 can also independently execute locally stored applications without RAN interaction. The platform 1102 can include a transceiver 1106 operably coupled to an application specific integrated circuit (ASIC) 1108, or other processor, microprocessor, logic circuit, or other data processing device. The ASIC 1108 or other processor executes the application programming interface (API) 1110 layer that interfaces with any resident programs in the memory 1112 of the wireless device. The memory 1112 can be comprised of read-only or random-access memory (RAM and ROM), EEPROM, flash cards, or any memory common to computer platforms. The platform 1102 also can include a local database 1114 that can store applications not actively used in memory 1112, as well as other data. The local database 1114 is typically a flash memory cell, but can be any secondary storage device as known in the art, such as magnetic media, EEPROM, optical media, tape, soft or hard disk, or the like.

Accordingly, one embodiment disclosed herein can include a UE (e.g., UE 1100A, 1100B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 1108, memory 1112, API 1110 and local database 1114 may all be used cooperatively to load, store and execute the various functions disclosed herein and thus the logic to perform these functions may be distributed over various elements. Alternatively, the functionality could be incorporated into one discrete component. Therefore, the features of the UEs 1100A and 1100B in FIG. 11 are to be considered merely illustrative and the disclosure is not limited to the illustrated features or arrangement.

The wireless communication between the UEs 1100A and/or 1100B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments disclosed herein and are merely to aid in describing aspects of the embodiments disclosed herein.

Figure 12:
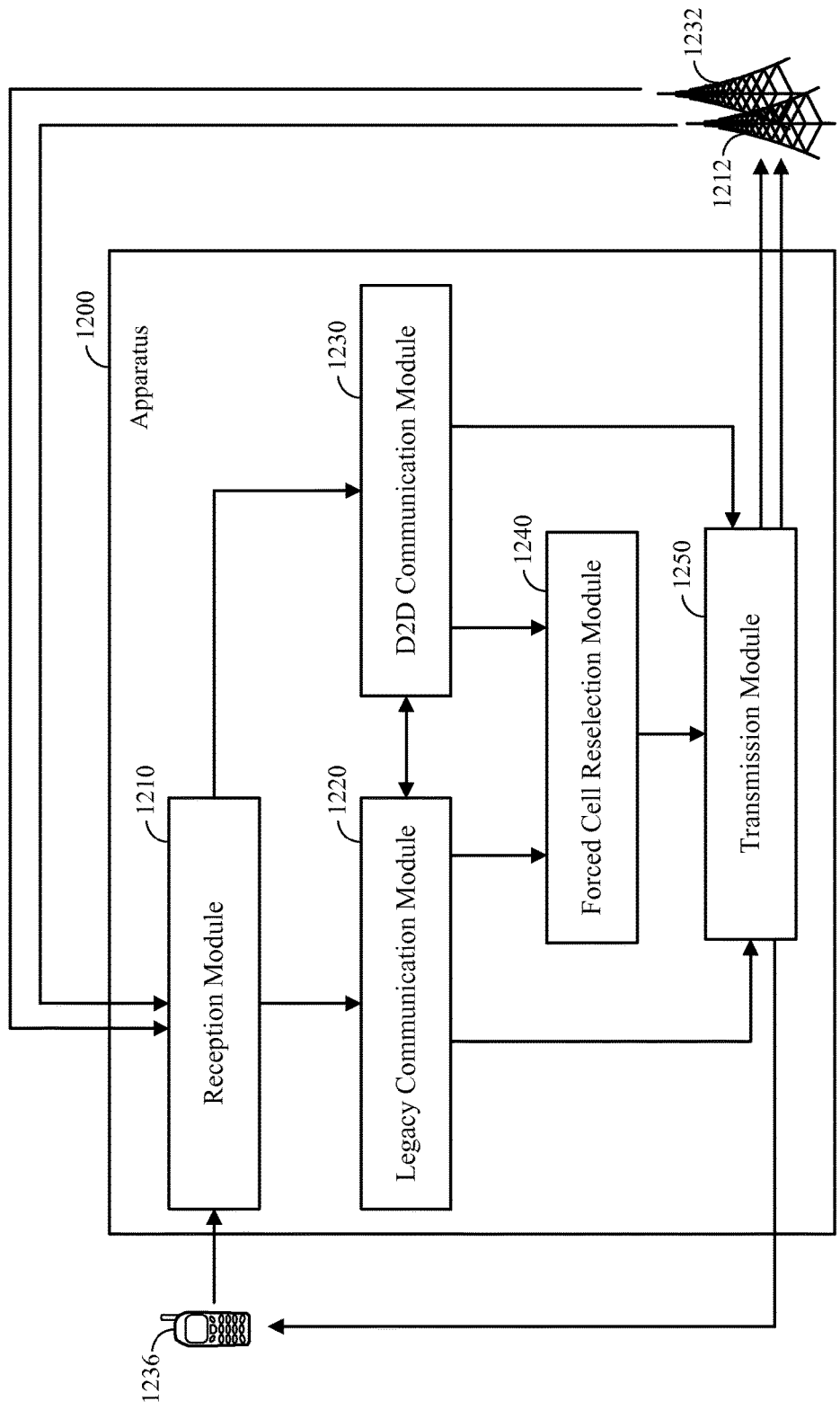
FIG. 12 illustrates an exemplary conceptual data flow between different modules, means, and/or components in an exemplary apparatus that may support D2D communications and forced cell reselection according to the various aspects and embodiments described herein.

According to various aspects, FIG. 12 illustrates an exemplary conceptual data flow between different modules, means, and/or components in an exemplary apparatus 1200 that may support D2D communications and forced cell reselection according to the various aspects and embodiments described herein.

In various embodiments, the apparatus 1200 may include a reception module 1210 that can receive measurements from a second UE 1236 with which the first UE may have established a D2D link. In addition, the reception module 1210 may further receive signaling and data from a current eNB 1212 onto which the first UE is camped and/or a neighboring eNB 1232 onto which the second UE 1236 is camped. Further, the reception module 1210 may receive information indicating that the apparatus 1200 and UE 1236 have established a D2D communication link. In various embodiments, the apparatus 1200 may further comprise a D2D communication module 1230 that can monitor one or more measurements associated with the D2D communication link and a legacy communication module 1220 that can monitor the legacy link with the eNB 1212 and/or energy observed from eNB 1232. The apparatus 1200 further includes a forced cell reselection module 1240 that may process the received UE measurements from the second UE 1236 to determine whether to trigger a forced cell reselection to the neighboring eNB 1232. For example, in various embodiments, the forced cell reselection module 1240 may move to the neighboring cell 1232 in response to determining that the apparatus 1200 and/or the second UE 1236 are located in a cell overlap region between the respective coverage areas associated with eNBs 1212, 1232 and that the reception module 1210 observed energy from the neighboring eNB 1232 that exceeds a particular threshold value.

In various embodiments, the apparatus 1200 may further include a transmission module 1250 that can transmit information associated with the D2D link and/or a legacy link with the current eNB 1212 directly to UE 1236 using the D2D link, and the transmission module 1250 may further transmit information associated with the D2D link and/or the legacy link to the current eNB 1212 using the legacy link. Furthermore, when the forced cell reselection module 1240 triggers reselection to the neighboring eNB 1232, the transmission module 1250 may transmit any information necessary to effectuate the forced cell reselection to the neighboring eNB 1232.

The apparatus 1200 may include additional modules that perform each of the steps of the forced cell reselection algorithm described above. As such, a module may perform each step in the aforementioned forced cell reselection algorithm and the apparatus 1200 may include one or more of such modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
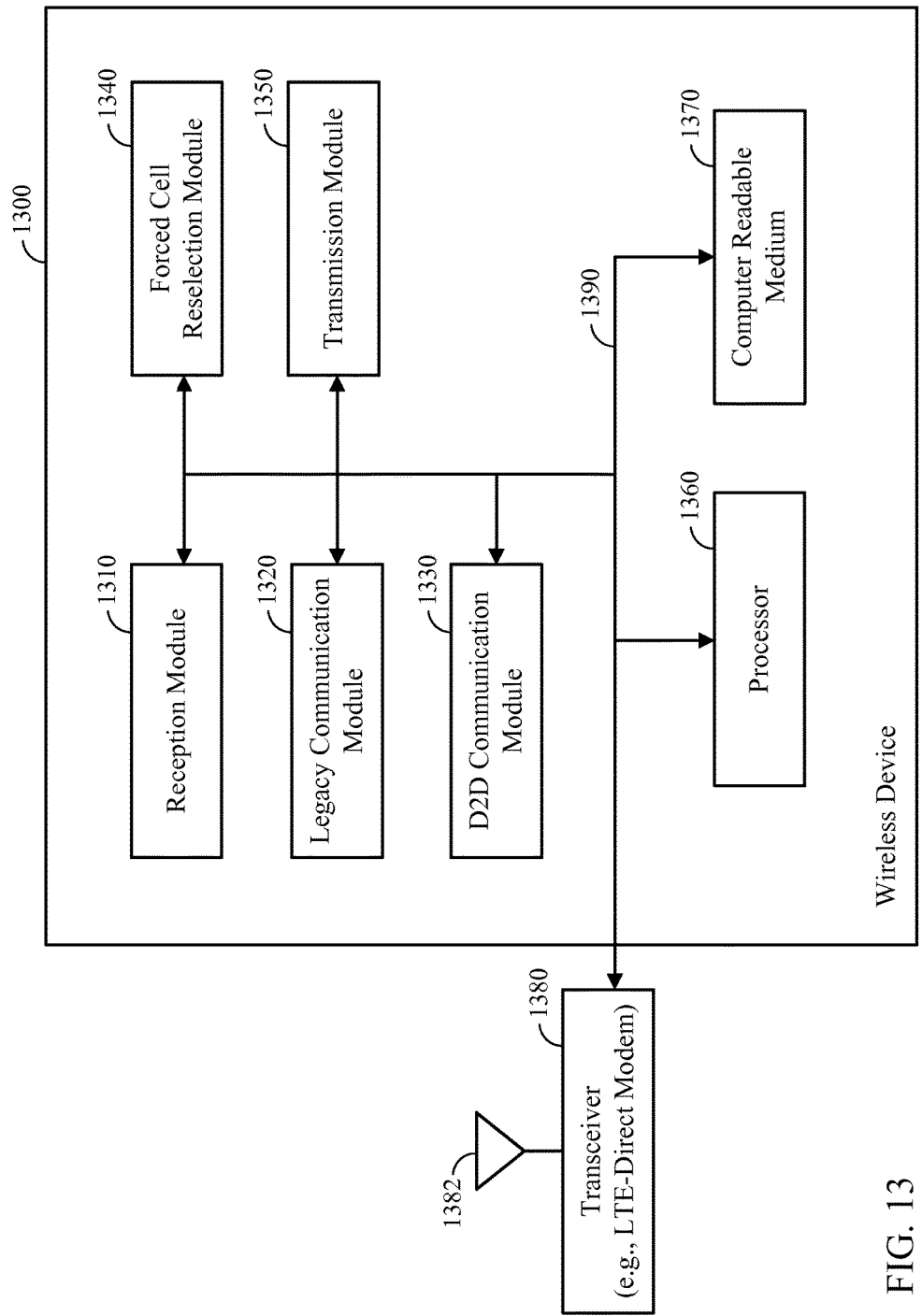
FIG. 13 illustrates an exemplary hardware implementation corresponding to a wireless device that may support D2D communications and forced cell reselection according to the various aspects and embodiments described herein.

According to various aspects, FIG. 13 illustrates an exemplary hardware implementation corresponding to a wireless device 1300 that may support D2D communications and forced cell reselection according to the various aspects and embodiments described herein. In various embodiments, the wireless device 1300 may comprise a processing system implemented with a bus architecture, represented generally by bus 1390. The bus 1390 may include any number of interconnecting buses and bridges depending on the specific application of the wireless device 1300 and the overall design constraints. The bus 1390 links together various circuits including one or more processors and/or hardware modules, represented by the processor 1360, computer-readable medium 1370, reception module 1310, legacy communication module 1320, D2D communication module 1330, forced cell reselection module 1340, and transmission module 1350. The bus 1390 may also link various other circuits such as timing sources, peripherals, voltage regulators, and power management circuits, which are well known in the art, and therefore, will not be described any further.

In various embodiments, the wireless device 1300 may further comprise a transceiver 1380, which may be coupled to one or more antennas 1382. The transceiver 1380 may provide a means (e.g., an LTE Direct modem) for communicating with various other apparatuses over a transmission medium. The wireless device 1300 includes a processor 1360 coupled to the computer-readable medium 1370, wherein the processor 1360 may be responsible for general processing, including the execution of software stored on the computer-readable medium 1370. The software, when executed by the processor 1360, may cause the processor 1360 to perform the various functions described in further detail above for any particular apparatus. The computer-readable medium 1370 may also be used to store data that the processor 1360 can then manipulate when executing software. The wireless device 1300 further includes at least one of the reception module 1310, the legacy communication module 1320, the D2D communication module 1330, the forced cell reselection module 1340, and the transmission module 1350. The modules may be software modules running in the processor 1360, resident/stored in the computer readable medium 1370, one or more hardware modules coupled to the processor 1360, or some combination thereof. The wireless device may further correspond to a UE and may include other suitable components as described herein (e.g., a memory, TX processor, RX processor, controller/processor, etc. as shown in connection with the UE 610 in FIG. 6).

In various embodiments, the UE 1100A, 1100B shown in FIG. 11, the apparatus 1200 shown in FIG. 12, and/or the wireless device 1300 shown in FIG. 13 may include means for exchanging communication information with a peer UE over an LTE Direct (LTE-D) connection, means for detecting that the peer UE is camped on a different base station relative to the UE 1100A, 1100B, the apparatus 1200, and/or the wireless device 1300 based on the exchanged communication information, means for measuring one or more communication parameters with the different base station in response to detecting that the UE 1100A, 1100B, the apparatus 1200, and/or the wireless device 1300 is in an overlapping coverage region associated with the base station to which the UE 1100A, 1100B, the apparatus 1200, and/or the wireless device 1300 is attached and the second base station to which the peer UE is attached, and means for triggering a forced cell reselection such that the UE 1100A, 1100B, the apparatus 1200, and/or the wireless device 1300 is camped on the same base station as the peer UE in response to the one or more measured communication parameters satisfying one or more performance criteria. In various embodiments, the above-mentioned means may be one or more of the aforementioned modules of the UEs 1100A, 1100B shown in FIG. 11, the apparatus 1200 shown in FIG. 12, and/or the wireless device 1300 shown in FIG. 13 that are configured or configurable to perform the functions recited in connection with the aforementioned means. As mentioned above, the wireless device may further include certain components associated with the UE 610 shown in FIG. 6, whereby in one example, the above-mentioned means may comprise the TX Processor 668, the RX Processor 656, the controller/processor 659, and/or other components associated with the UE 610 that are configured or configurable to perform the functions recited in connection with the above-mentioned means.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination thereof. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, those skilled in the art will appreciate that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for improving device-to-device (D2D) communication in an LTE Direct (LTE-D) communication system, comprising:
    exchanging communication information between a first user equipment (UE) and a second UE over an LTE-D connection;
    detecting that the first UE is camped on a first base station and that the second UE is camped on a second base station based on the exchanged communication information;
    measuring, at the first UE, one or more communication parameters with the second base station in response to detecting that at least the first UE is in an overlapping coverage region associated with the first base station and the second base station; and
    triggering a forced cell reselection such that the first UE and the second UE are each camped on the same base station in response to the one or more measured communication parameters satisfying one or more performance criteria.

2. The method recited in claim 1, wherein the one or more performance criteria comprise a threshold value sufficient to reselect from the first base station to the second base station.

3. The method recited in claim 2, wherein the measured communication parameters comprise one or more of a reference signal received power (RSRP), a reference signal received quality (RSRQ), or a received signal strength indicator (RSSI) associated with one or more signals that the first UE receives from the second base station.

4. The method recited in claim 1, further comprising returning to the first base station in response to the forced reselection to the second base station failing.

5. The method recited in claim 1, further comprising maintaining the connection with the first base station in response to determining that the first UE is exchanging data with the first base station over an active data connection.

6. The method recited in claim 1, wherein the one or more performance criteria are dynamically adjusted according to one or more reference signal received quality (RSRQ) parameters that indicate performance at the first base station and the second base station based on respective interference levels and user loads at the first and second base stations.

7. The method recited in claim 1, wherein the forced reselection is triggered at either the first UE based on first base station having more UEs involved in the LTE-D connection camped thereon compared with the second base station or at the second UE based on second base station having more UEs involved in the LTE-D connection camped thereon compared with the first base station.

8. The method recited in claim 1, further comprising:
    determining that the first UE and the second UE are each in the overlapping coverage region associated with the first base station and the second base station; and
    negotiating with the second UE to coordinate the forced reselection, wherein the negotiating comprises determining one of the first UE or the second UE to carry out the forced reselection.

9. The method recited in claim 8, wherein negotiating with the second UE to coordinate the forced reselection comprises:
    exchanging one or more private LTE-D Expressions that contain the one or more measured communication parameters; and
    triggering the forced cell reselection at the first UE in response to determining that a first link from the first UE to the second base station is stronger than a second link from the second UE to the first base station based on the private LTE-D Expressions.

10. The method recited in claim 8, wherein negotiating with the second UE to coordinate the forced reselection comprises:
    exchanging one or more private LTE-D Expressions that contain the one or more measured communication parameters; and
    triggering the forced cell reselection at the second UE in response to determining that a first link from the second UE to the first base station is stronger than a second link from the first UE to the second base station based on the private LTE-D Expressions.

11. The method recited in claim 10, further comprising:
    receiving, at the first UE, a notification from the second UE indicating that the second UE failed to successfully reselect to the first base station; and
    triggering the forced cell reselection at the first UE in response to the notification.

12. The method recited in claim 8, wherein negotiating with the second UE to coordinate the forced reselection comprises:
    determining that either the first UE or the second UE has an active legacy link and that the other UE has an inactive legacy link; and
    triggering the forced cell reselection at the UE having the inactive legacy link.

13. A wireless device, comprising:
    a transceiver configured to exchange communication information with a peer wireless device over an LTE Direct (LTE-D) connection; and
    one or more processors configured to:
        detect that the wireless device is camped on a first base station and that the peer wireless device is camped on a second base station based on the communication information exchanged with the peer wireless device;
        measure one or more communication parameters with the second base station in response to detecting presence in an overlapping coverage region associated with the first base station and the second base station; and trigger a forced cell reselection such that the wireless device and the peer wireless device are each camped on the same base station in response to the one or more measured communication parameters satisfying one or more performance criteria.

14. The wireless device recited in claim 13, wherein the one or more performance criteria comprise a threshold value sufficient to reselect from the first base station to the second base station.

15. The wireless device recited in claim 14, wherein the measured communication parameters comprise one or more of a reference signal received power (RSRP), a reference signal received quality (RSRQ), or a received signal strength indicator (RSSI) associated with one or more signals received at the transceiver from the second base station.

16. The wireless device recited in claim 13, wherein the one or more processors are further configured to return to the first base station in response to the forced reselection to the second base station failing.

17. The wireless device recited in claim 13, wherein the one or more processors are further configured to maintain the connection with the first base station in response to the wireless device exchanging data with the first base station over an active data connection.

18. The wireless device recited in claim 13, wherein the one or more performance criteria are dynamically adjusted according to one or more reference signal received quality (RSRQ) parameters that indicate performance at the first base station and the second base station based on respective interference levels and user loads at the first and second base stations.

19. The wireless device recited in claim 13, wherein the forced reselection is triggered at either the wireless device based on first base station having more wireless devices involved in the LTE-D connection camped thereon compared with the second base station or at the peer wireless device based on second base station having more wireless devices involved in the LTE-D connection camped thereon compared with the first base station.

20. The wireless device recited in claim 13, wherein the one or more processors are further configured to:
determine that the wireless device and the peer wireless device are each in the overlapping coverage region between the first base station and the second base station; and
negotiate with the peer wireless device to determine one of the wireless device or the peer wireless device to carry out the forced reselection.

21. The wireless device recited in claim 20, wherein:
the transceiver is further configured to exchange one or more private LTE-D Expressions that contain the one or more measured communication parameters; and
the one or more processors are further configured to trigger the forced cell reselection at the wireless device in response to the measured communication parameters contained in the one or more private LTE-D Expressions indicating that the wireless device has a stronger link to the second base station compared to a link from the peer wireless device to the first base station.

22. The wireless device recited in claim 20, wherein:
the transceiver is further configured to exchange one or more private LTE-D Expressions that contain the one or more measured communication parameters; and the one or more processors are further configured to trigger the forced cell reselection at the peer wireless device in response to the measured communication parameters contained in the one or more private LTE-D Expressions indicating that the peer wireless device has a stronger link to the first base station compared to a link from the wireless device to the second base station.

23. The wireless device recited in claim 22, further comprising:
the transceiver is further configured to receive a notification indicating that the peer wireless device failed to successfully reselect to the first base station; and
the one or more processors are further configured to trigger the forced cell reselection at the wireless device in response to the notification.

24. The wireless device recited in claim 20, wherein the one or more processors are further configured to:
determine that either the wireless device or the peer wireless device has an active legacy link and that the other wireless device has an inactive legacy link; and
trigger the forced cell reselection at the wireless device determined to have the inactive legacy link.

25. An apparatus, comprising:
means for exchanging communication information with a peer wireless device over an LTE Direct (LTE-D) connection;
means for detecting that the apparatus is camped on a first base station and that the peer wireless device is camped on a second base station based on the communication information exchanged with the peer wireless device;
means for measuring one or more communication parameters with the second base station in response to detecting presence in an overlapping coverage region associated with the first base station and the second base station; and
means for triggering a forced cell reselection such that the apparatus and the peer wireless device are each camped on the same base station in response to the one or more measured communication parameters satisfying one or more performance criteria.

26. The apparatus recited in claim 25, wherein the one or more performance criteria comprise a threshold value sufficient to reselect from the first base station to the second base station.

27. The apparatus recited in claim 26, wherein the measured communication parameters comprise one or more of a reference signal received power (RSRP), a reference signal received quality (RSRQ), or a received signal strength indicator (RSSI) associated with one or more signals received at the apparatus from the second base station.

28. The apparatus recited in claim 25, further comprising means for returning to the first base station in response to the forced reselection to the second base station failing.

29. The apparatus recited in claim 25, further comprising means for maintaining the connection with the first base station in response to the apparatus exchanging data with the first base station over an active data connection.

30. The apparatus recited in claim 25, wherein the one or more performance criteria are dynamically adjusted according to one or more reference signal received quality (RSRQ) parameters that indicate performance at the first base station and the second base station based on respective interference levels and user loads at the first and second base stations.

31. The apparatus recited in claim 25, wherein the forced reselection is triggered at either the apparatus based on first base station having more wireless devices involved in the LTE-D connection camped thereon compared with the second base station or at the peer wireless device based on second base station having more wireless devices involved in the LTE-D connection camped thereon compared with the first base station.

32. The apparatus recited in claim 25, further comprising:
means for determining that the apparatus and the peer wireless device are each in the overlapping coverage region between the first base station and the second base station; and
means for negotiating with the peer wireless device to determine one of the apparatus or the peer wireless device to carry out the forced reselection.

33. The apparatus recited in claim 32, wherein the means for negotiating comprises:
means for exchanging one or more private LTE-D Expressions that contain the one or more measured communication parameters; and
means for triggering the forced cell reselection at the apparatus in response to the measured communication parameters contained in the one or more private LTE-D Expressions indicating that the apparatus has a stronger link to the second base station compared to a link from the peer wireless device to the first base station.

34. The apparatus recited in claim 32, wherein the means for negotiating comprises:
means for exchanging one or more private LTE-D Expressions that contain the one or more measured communication parameters; and
means for triggering the forced cell reselection at the peer wireless device in response to the measured communication parameters contained in the one or more private LTE-D Expressions indicating that the peer wireless device has a stronger link to the first base station compared to a link from the apparatus to the second base station.

35. The apparatus recited in claim 34, further comprising:
means for receiving a notification indicating that the peer wireless device failed to successfully reselect to the first base station; and
means for triggering the forced cell reselection at the apparatus in response to the notification.

36. The apparatus recited in claim 32, further comprising:
means for determining that either the apparatus or the peer wireless device has an active legacy link and that the other has an inactive legacy link; and
means for triggering the forced cell reselection at the apparatus or the peer wireless device depending on which has the inactive legacy link.

37. A computer-readable storage medium having computer-executable instructions recorded thereon, wherein executing the computer-executable instructions on a wireless device having one or more processors causes the one or more processors to:
exchange communication information with a peer wireless device over an LTE Direct (LTE-D) connection;
detect that the wireless device is camped on a first base station and that the peer wireless device is camped on a second base station based on the communication information exchanged with the peer wireless device;
measure one or more communication parameters with the second base station in response to detecting presence in an overlapping coverage region associated with the first base station and the second base station; and
trigger a forced cell reselection such that the wireless device and the peer wireless device are each camped on the same base station in response to the one or more measured communication parameters satisfying one or more performance criteria.

38. The computer-readable storage medium recited in claim 37, wherein the one or more performance criteria comprise a threshold value sufficient to reselect from the first base station to the second base station.

39. The computer-readable storage medium recited in claim 38, wherein the measured communication parameters comprise one or more of a reference signal received power (RSRP), a reference signal received quality (RSRQ), or a received signal strength indicator (RSSI) associated with one or more signals received from the second base station.

40. The computer-readable storage medium recited in claim 37, wherein executing the computer-executable instructions further causes the one or more processors to return to the first base station in response to the forced reselection to the second base station failing.

41. The computer-readable storage medium recited in claim 37, wherein executing the computer-executable instructions further causes the one or more processors to maintain the connection with the first base station in response to the wireless device exchanging data with the first base station over an active data connection.

42. The computer-readable storage medium recited in claim 37, wherein the one or more performance criteria are dynamically adjusted according to one or more reference signal received quality (RSRQ) parameters that indicate performance at the first base station and the second base station based on respective interference levels and user loads at the first and second base stations.

43. The computer-readable storage medium recited in claim 37, wherein the forced reselection is triggered at either the wireless device based on first base station having more wireless devices involved in the LTE-D connection camped thereon compared with the second base station or at the peer wireless device based on second base station having more wireless devices involved in the LTE-D connection camped thereon compared with the first base station.

44. The computer-readable storage medium recited in claim 37, wherein executing the computer-executable instructions further causes the one or more processors to:
determine that the wireless device and the peer wireless device are each in the overlapping coverage region between the first base station and the second base station; and
negotiate with the peer wireless device to determine one of the wireless device or the peer wireless device to carry out the forced reselection.

45. The computer-readable storage medium recited in claim 44, wherein executing the computer-executable instructions further causes the one or more processors to:
exchange one or more private LTE-D Expressions that contain the one or more measured communication parameters; and
trigger the forced cell reselection at the wireless device in response to the measured communication parameters contained in the one or more private LTE-D Expressions indicating that the wireless device has a stronger link to the second base station compared to a link from the peer wireless device to the first base station.

46. The computer-readable storage medium recited in claim 44, wherein executing the computer-executable instructions further causes the one or more processors to:
exchange one or more private LTE-D Expressions that contain the one or more measured communication parameters; and trigger the forced cell reselection at the peer wireless device in response to the measured communication parameters contained in the one or more private LTE-D Expressions indicating that the peer wireless device has a stronger link to the first base station compared to a link from the wireless device to the second base station.

47. The computer-readable storage medium recited in claim 46, wherein executing the computer-executable instructions further causes the one or more processors to:
  receive a notification indicating that the peer wireless device failed to successfully reselect to the first base station; and
  trigger the forced cell reselection at the wireless device in response to the notification.

48. The computer-readable storage medium recited in claim 44, wherein executing the computer-executable instructions further causes the one or more processors to:
  determine that either the wireless device or the peer wireless device has an active legacy link and that the other wireless device has an inactive legacy link; and
  trigger the forced cell reselection at the wireless device determined to have the inactive legacy link.

* * * * *